United States Patent
Ushiki et al.

(10) Patent No.: US 8,427,530 B2
(45) Date of Patent: Apr. 23, 2013

(54) IMAGE PROCESSING APPARATUS, IMAGE PROCESSING METHOD, AND PROGRAM

(75) Inventors: Suguru Ushiki, Tokyo (JP); Yasunari Hatasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 12/624,867

(22) Filed: Nov. 24, 2009

(65) Prior Publication Data

US 2010/0149321 A1 Jun. 17, 2010

(30) Foreign Application Priority Data

Dec. 11, 2008 (JP) .............................. P2008-315524

(51) Int. Cl.
*H04N 15/00* (2006.01)
*H04N 13/04* (2006.01)

(52) U.S. Cl.
USPC ......... 348/51; 345/6; 345/7; 359/462; 349/15

(58) Field of Classification Search .................... 348/51; 345/6, 7; 359/462; 349/15
See application file for complete search history.

(56) References Cited

U.S. PATENT DOCUMENTS

| 6,337,721 B1 * | 1/2002 | Hamagishi et al. ............. 349/15 |
| 2004/0135740 A1 * | 7/2004 | Sato et al. ........................ 345/6 |
| 2007/0268579 A1 * | 11/2007 | Yang .............................. 359/462 |

FOREIGN PATENT DOCUMENTS

| JP | 2003-75773 | 3/2003 |
| JP | 2005-215326 | 8/2005 |

\* cited by examiner

*Primary Examiner* — Kyung H Shin
(74) *Attorney, Agent, or Firm* — Finnegan Henderson Farabow Garrett & Dunner LLP

(57) ABSTRACT

An image processing apparatus includes an input unit, a computing unit, a determining unit, and a 3D image processor. The input unit receives filter width information indicating the vertical size of each line constituting a polarizing filter, as well as position correction information indicating positional misalignment of the polarizing filter. The computing unit computes determination regions for each pixel on the basis of the information. The determination regions are used to determine whether individual pixels constituting a 3D image to be output are contained in a right-eye or a left-eye image region. On the basis of the determination regions, the determining unit determines whether each pixel is contained in a right-eye image region or a left-eye image region. The 3D image processor creates a 3D image from a right-eye image and a left-eye image according to pixel positions determined on the basis of determination results.

9 Claims, 12 Drawing Sheets

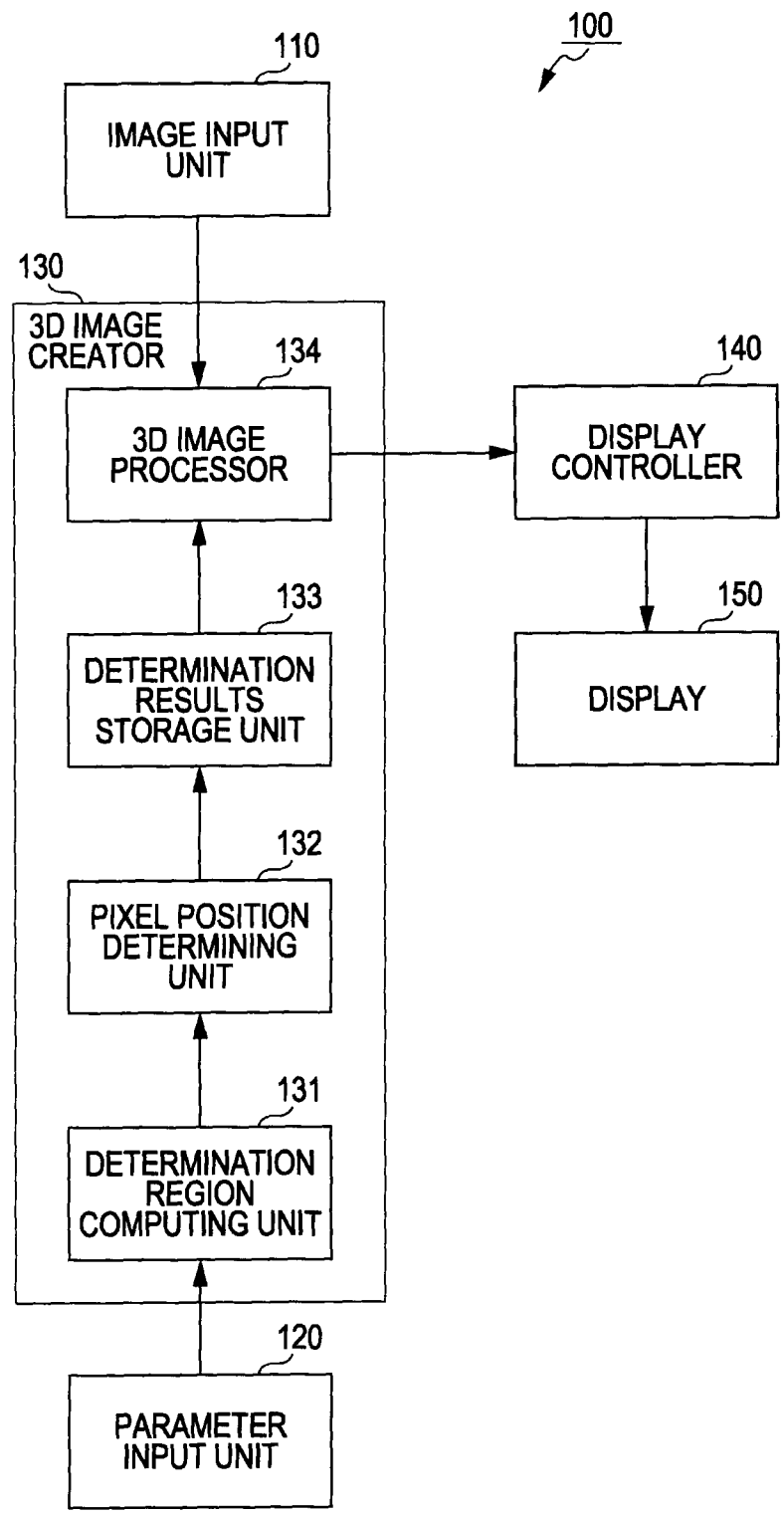

$2\sqrt{2}w, dv, dr \longrightarrow$

IMAGE PROCESSING APPARATUS, IMAGE PROCESSING METHOD, AND PROGRAM

BACKGROUND OF THE INVENTION

1. Field of the Invention

The present invention relates to an image processing apparatus. More particularly, the present invention relates to an image processing apparatus configured to create a three-dimensional (3D) image, as well as to a processing method for the same, and a program causing a computer to execute the method.

2. Description of the Related Art

Previously, 3D image display technology has been proposed, which enables an image to be displayed on a display apparatus and made to appear three-dimensional (i.e., stereoscopic) to the user. For example, a 3D image display method has been proposed wherein a 3D image made up of left-eye images and right-eye images (hereinafter also referred to as left and right images) alternately arranged on single horizontal lines is displayed on the screen of a display apparatus with an affixed polarizing filter. The polarizing filter herein is made up of a filter for the left eye and a filter for the right eye, with the right-eye filter being affixed to the portion where right-eye images are displayed, and the left-eye filter being affixed to the portion where the left-eye images are displayed. In so doing, a user wearing polarizing glasses see the right-eye images entering his or her right eye, and the left-eye images entering his or her left eye. One proposed 3D image display method that utilizes parallax between right-eye images and left-eye images is, for example, the μPol (pronounced micropol) technique, which allows a 3D image displayed on a screen to appear three-dimensional (see, for example, Japanese Unexamined Patent Application Publication No. 2005-215326, FIG. 1).

However, in the above μPol technique, if the polarizing filter is not affixed at the correct position with respect to the positions of pixels on the screen, the images entering either eye are not correctly separated. In this case, clean 3D images are no longer seen (in other words, cross-talk occurs).

Consequently, methods have been proposed wherein, for example, machinery and equipment are used to align and affix the polarizing filter at the correct position with respect to the screen of the display apparatus before shipment (see, for example, Japanese Unexamined Patent Application Publication No. 2003-75773, FIG. 7).

SUMMARY OF THE INVENTION

According to the above technology of the related art, a polarizing filter can be affixed at a correct position with respect to the positions of pixels on the screen of a display apparatus. However, it also conceivable that a user may purchase a polarizing filter separately from a display apparatus, and manually attach the polarizing filter to the display apparatus, for example. In this case, the above filter alignment method of the related art is not used, and thus it is assumed that it will be difficult to affix the polarizing filter at the correct position with respect to the positions of pixels on the screen of the display apparatus. Consequently, it is important to suitably display 3D images even when, for example, the user manually attaches a polarizing filter to a display apparatus.

It is thus desirable to provide means to suitably display a 3D image.

An image processing apparatus in accordance with a first embodiment of the present invention includes: an input unit configured to receive filter width information indicating the vertical size of each line constituting a polarizing filter, as well as position correction information indicating positional misalignment of the polarizing filter; a computing unit configured to compute determination regions for each pixel on the basis of the filter width information and the position correction information, with the determination regions being used to determine whether individual pixels constituting a 3D image to be output are contained in a right-eye image region or a left-eye image region; a determining unit configured to determine, on a per-pixel basis, whether a respective pixel is contained in a right-eye image region or a left-eye image region, the determination being made on the basis of the determination regions computed for each pixel; and a 3D image processor configured to create a 3D image from a right-eye image and a left-eye image according to pixel positions determined on the basis of determination results from the determining unit. The above may also be realized as a processing method in such an image processing apparatus, or as a program that causes a computer to execute the method. As a result, filter width information and position correction information are used as a basis for determining whether individual pixels of the 3D image are contained in a right-eye image region or a left-eye image region. A 3D image is then created from a right-eye image and a left-eye image according to pixel positions determined on the basis of the determination results.

In addition, in the first embodiment of the present invention, the position correction information may include information regarding vertical misalignment of the polarizing filter, and the computing unit may compute the determination regions in the form of horizontal lines having fixed vertical widths specified by the filter width information and the misalignment information. In so doing, the determination regions are computed as horizontal lines having fixed vertical widths specified by the filter width information and the misalignment information.

In addition, in the first embodiment of the present invention, the polarizing filter may be affixed to the front of a display screen upon which the created 3D image is displayed, with the vertical size of each line constituting the polarizing filter being twice a reference value expressing the vertical size of the pixels. The computing unit may compute the determination regions having fixed widths equal to the vertical size of the pixels. In so doing, the filter width information is taken to be twice a reference value expressing the vertical size of the pixels, while the determination regions are computed having fixed widths equal to the vertical size of the pixels.

In addition, in the first embodiment of the present invention, the position correction information may include information regarding rotational misalignment of the polarizing filter, and the computing unit may compute the determination regions by rotating the horizontal lines by an angle specified by the rotational misalignment information. In so doing, the determination regions are computed as horizontal lines that have been rotated by an angle specified by the rotational misalignment information.

In addition, in the first embodiment of the present invention, the polarizing filter may be affixed to the front of a display screen upon which the created 3D image is displayed, with the vertical size of each line constituting the polarizing filter being $2\sqrt{2}$ times a reference value expressing the vertical size of the pixels. In so doing, determination regions are computed using filter width information taken to be $2\sqrt{2}$ times a reference value expressing the vertical size of the pixels constituting the 3D image.

In addition, in the first embodiment of the present invention, pixels determined to be contained in neither a right-eye image region nor a left-eye image region may be determined by the determining unit to be contained in an invalid image region where the 3D image is not output. In so doing, a 3D image is created containing pixels contained in invalid regions.

An image processing apparatus in accordance with a second embodiment of the present invention includes: an input unit configured to receive filter width information indicating the vertical size of each line constituting a polarizing filter, as well as position correction information indicating positional misalignment of the polarizing filter; a computing unit configured to compute determination regions for each pixel on the basis of the filter width information and the position correction information, with the determination regions being used to determine whether individual pixels constituting a 3D image to be output are contained in a right-eye image region or a left-eye image region; a determining unit configured to determine, on a per-pixel basis, whether a respective pixel is contained in a right-eye image region or a left-eye image region, the determination being made on the basis of the determination regions computed for each pixel; and a determination results storage unit configured to store 3D image pixel layout position information indicating the pixel positions of each pixel constituting a right-eye image and a left-eye image used to create the 3D image, with the pixel positions being determined on the basis of the determination results from the determining unit. The above may also be realized as a processing method in such an image processing apparatus, or as a program that causes a computer to execute the method. As a result, filter width information and position correction information are used as a basis for determining whether individual pixels of the 3D image are contained in a right-eye image region or a left-eye image region. On the basis of these determination results, pixel positions are determined for each pixel constituting a right-eye image and a left-eye image. The determined pixel positions are then stored as 3D image pixel layout position information.

An embodiment of the present invention thus exhibits the excellent advantage of being able to suitably display a 3D image.

BRIEF DESCRIPTION OF THE DRAWINGS

FIG. 1 is a block diagram illustrating an exemplary functional configuration of an image processing apparatus in accordance with a first embodiment of the present invention;

DESCRIPTION OF THE PREFERRED EMBODIMENTS

Figure 2A:
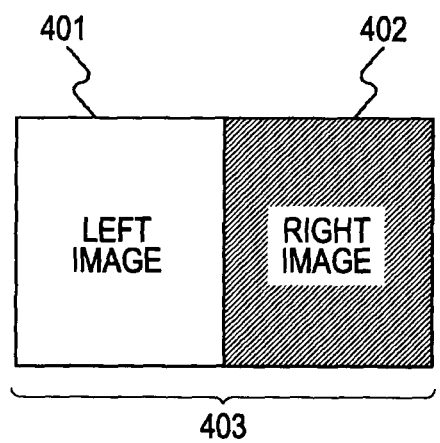
FIG. 2A illustrates an example of images input into an image input unit in accordance with a first embodiment of the present invention.

Hereinafter, preferred embodiments of the present invention will be described. The description will proceeds as follows.

1. First embodiment (3D image creation control: example of correcting vertical misalignment of polarizing filter)
2. Second embodiment (3D image creation control: example of correcting vertical misalignment and rotational misalignment of polarizing filter)

1. First Embodiment

[Exemplary Configuration of Image Processing Apparatus]

FIG. 1 is a block diagram illustrating an exemplary functional configuration of an image processing apparatus 100 in accordance with the first embodiment of the present invention. The image processing apparatus 100 is provided with an image input unit 110, a parameter input unit 120, a 3D image creator 130, a display controller 140, and a display 150.

The image input unit 110 accepts an image containing a left-eye image and a right-eye image as input, and outputs the input image to the 3D image creator 130. Herein, a 3D image (i.e., stereoscopic image) refers to an image that utilizes parallax due to the differing positions of humans' left and right eyes to cause the user to view the image three-dimensionally. For example, an image made up of pixels from a left-eye image and a right-eye image alternately arranged on single horizontal lines may be used as a 3D image. Herein, a right-eye image and a left-eye image constitute an image set that acts as the basis for a 3D image created by the 3D image creator 130. A single right-eye image and a single left-eye image constituting such an image set are associated together and input into the image input unit 110. When displaying a 3D image on-screen, the right-eye image constituting part of the 3D image enters the right eye of a user wearing polarizing glasses via a polarizing filter, while the left-eye image similarly enters the user's left eye. The polarizing filter is made up of right-eye filters and left-eye filters equal in size to pixel lines formed by the right-eye image and the left-eye image constituting the 3D image. The poi technology is an example of such a polarizing filter. The images input into the image input unit 110 will be later described in detail using FIGS. 2A and 2B.

The parameter input unit 120 accepts the input of various parameters indicating quantities such as the polarizing filter width and positional misalignments of the polarizing filter. The parameter input unit 120 outputs the values of these various parameters to the 3D image creator 130. The parameter input unit 120 may be provided with user-operable buttons for inputting numerical values and other information, and accept parameters input using these user-operable buttons. In addition, the parameter input unit 120 may also wirelessly receive operational input according to user-operable buttons on a remote control or similar device, and accept parameters corresponding to the received operational input. The parameter input unit 120 herein is an example of the input unit stated in the claims.

The 3D image creator 130 is provided with a determination region computing unit 131, a pixel layout position determining unit 132, a determination results storage unit 133, and a 3D image processor 134, and creates a 3D image on the basis of an image containing a right-eye image and a left-eye image output from the image input unit 110. In addition, when parameters are received by the parameter input unit 120, the 3D image creator 130 uses those parameters as a basis for determining whether each pixel constituting the 3D image is contained in the right-eye image region or the left-eye image region, and then creates the 3D image on the basis of the determination results. Herein, the right-eye image region is the region in which the respective pixels constituting the right-eye image are laid out in order to create a 3D image. Likewise, the left-eye image region is the region in which the respective pixels constituting the left-eye image are laid out in order to create a 3D image.

For each pixel constituting the 3D image, the determination region computing unit 131 computes determination regions on the basis of the parameters output by the parameter input unit 120, and outputs information regarding the determination regions to the pixel layout position determining unit 132. Herein, a determination region is a region on the 3D image for determining whether a respective pixel constituting the 3D image is contained in the right-eye image region or the left-eye image region. The computation of determination regions by the determination region computing unit 131 will be later described in detail using FIG. 4A. The determination region computing unit 131 herein is an example of the computing unit stated in the claims.

On the basis of information indicating determination regions output from the determination region computing unit 131, the pixel layout position determining unit 132 determines whether a respective pixel constituting the 3D image is contained in the right-eye image region or the left-eye image region. In addition, the pixel layout position determining unit 132 determines pixels contained in neither the right-eye image region nor the left-eye image region to be contained in an invalid image region. After determination, the pixel layout position determining unit 132 outputs the determination results to the determination results storage unit 133. The pixel determination by the pixel layout position determining unit 132 will be later described in detail using FIG. 4B. The pixel layout position determining unit 132 herein is an example of the determining unit stated in the claims.

The determination results storage unit 133 associates the determination results output from the pixel layout position determining unit 132 with a pixel group corresponding to the 3D image to be created, and stores the result as 3D image pixel layout position information. The determination results storage unit 133 also outputs stored 3D image pixel layout position information to the 3D image processor 134.

On the basis of the 3D image pixel layout position information output from the determination results storage unit 133, the 3D image processor 134 extracts images from the right-eye image and the left-eye image output from the image input unit 110, and creates a 3D image. The 3D image processor 134 outputs the created 3D image to the display controller 140. The method for creating 3D images that is executed by the 3D image processor 134 will be later described in detail using FIGS. 5A and 5B.

The display controller 140 conducts a display control that causes the 3D image output from the 3D image creator 130 to be displayed on the display 150.

The display 150 includes a display apparatus or similar component, and displays the 3D image output from the display controller 140.

[Exemplary Images Input into the Image Input Unit]

Figure 2B:
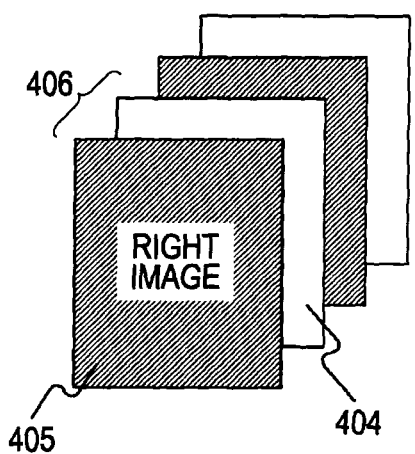
FIG. 2B illustrates an example of images input into an image input unit in accordance with a first embodiment of the present invention.

FIGS. 2A and 2B illustrate exemplary images input into the image input unit 110 in accordance with the first embodiment of the present invention. FIG. 2A illustrates the example of a right-eye image and a left-eye image for creating a 3D image using a side-by-side technique. In a side-by-side technique, the right-eye image and the left-eye image in the image set are laid out side-by-side. FIG. 2B illustrates the example of a right-eye image and a left-eye image for creating a 3D image using a frame sequential technique. In a frame sequential technique, the right-eye image and the left-eye image in the image set are realized by sequential frames.

For example, in the side-by-side technique shown in FIG. 2A, a right-eye image 402 and a left-eye image 401 in an image set are laid out side-by-side to realize an image 403. This image 403 is input into the image input unit 110, and a 3D image is created on the basis thereof. As another example, in the frame sequential technique shown in FIG. 2B, a right-eye image 405 and a left-eye image 404 in an image set are realized by two sequential frames. In FIG. 2B, these two sequential frames are labeled with the reference number 406. At this point, it should be appreciated that the embodiments of the present invention herein describe the example of displaying 3D images as video, and hereinafter, individual frames (i.e., images) constituting such video will be primarily described for the sake of simplicity. For example, the image 403, the right-eye image 405, and the left-eye image 404 are all examples of single frames constituting a video for creating 3D images. A single frame constituting video to be displayed as a series of 3D images is created on the basis of the image 403. In addition, a single frame constituting video to be displayed as a series of 3D images is created on the basis of both the right-eye image 405 and the left-eye image 404.

[Exemplary 3D Image Creation]

Figure 3A:
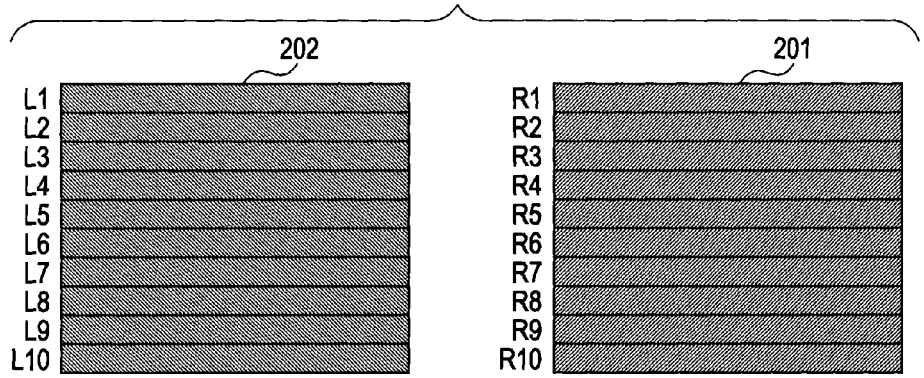
FIG. 3A illustrates an exemplary method for creating a 3D image to be displayed on the screen of a display apparatus, in the case where parameter input is not received by a parameter input unit in accordance with a first embodiment of the present invention.
Figure 3B:
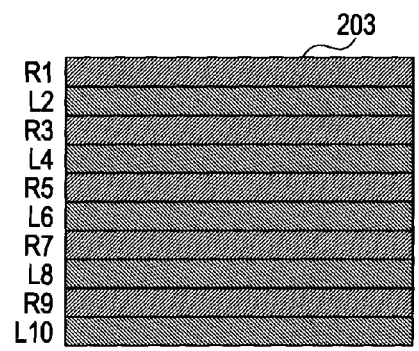
FIG. 3B illustrates an exemplary method for creating a 3D image to be displayed on the screen of a display apparatus, in the case where parameter input is not received by a parameter input unit in accordance with a first embodiment of the present invention.
Figure 3C:
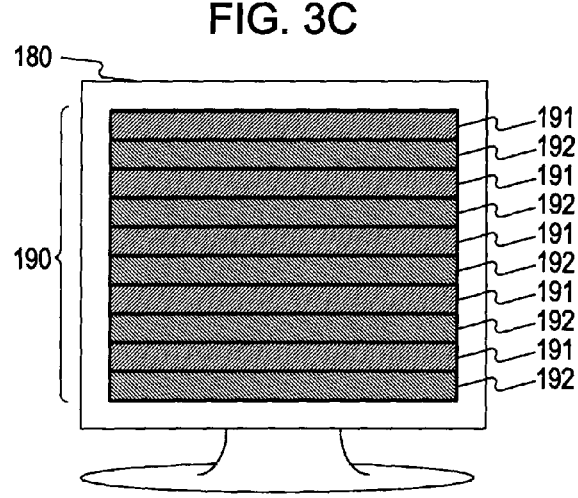
FIG. 3C illustrates an exemplary method for creating a 3D image to be displayed on the screen of a display apparatus, in the case where parameter input is not received by a parameter input unit in accordance with a first embodiment of the present invention.

FIGS. 3A to 3C illustrate an exemplary method whereby a 3D image is created by the 3D image creator 130 in accordance with the first embodiment of the present invention. In this example, a polarizing filter 190 is attached to the screen of a display apparatus 180 without any misalignments. For this reason, FIGS. 3A to 3C illustrate the case where positional misalignment of the polarizing filter is not considered. Herein, the display apparatus 180 shown in FIG. 3C is an exterior illustration of the image processing apparatus 100, and corresponds to the display 150 shown in FIG. 1.

FIG. 3A shows a right-eye image 201 and a left-eye image 202, which are input into the image input unit 110. The pixel lines R1 to R10 constituting the right-eye image 201 shown in FIG. 3A each represent a pixel line having a height of one pixel, and containing all pixels in the horizontal direction at that height in the right-eye image 201. Likewise, the pixel lines L1 to L10 constituting the left-eye image 202 shown in FIG. 3A each represent a pixel line having a height of one pixel, and containing all pixels in the horizontal direction at that height in the left-eye image 202. Herein, the right-eye image 201 is an image for the right eye that is used to create a 3D image. For example, among the pixel lines R1 to R10, the portions of the image contained in the odd-numbered pixel lines R1, R3, R5, R7, and R9 may be inserted into every other scan line in the 3D image. Meanwhile, the left-eye image 202 is an image for the left eye that is used to create a 3D image. For example, among the pixel lines L1 to L10, the portions of the image contained in the even-numbered pixel lines L2, L4, L6, L8, and L10 may be inserted into every other scan line in the 3D image. An exemplary layout of the images for the left and right eyes is illustrated in FIG. 3B. The image input unit 110 outputs the above right-eye image 201 and left-eye image 202 to the 3D image creator 130. In the embodiments of the present invention described herein, the respective pixels constituting each image are illustrated schematically for the sake of simplicity.

FIG. 3B illustrates an exemplary 3D image 203 created by the 3D image creator 130. As shown in FIG. 3B, the 3D image 203 is realized by laying out pixel lines of images for the left and right eyes that have been extracted from right-eye image 201 and the left-eye image 202. For example, the pixel lines R1, R3, R5, R7, and R9 inserted into every other line of the right-eye image 201 may be alternately laid out in the vertical direction with the pixel lines L2, L4, L6, L8, and L10 inserted into every other line of the left-eye image 202. After creating the 3D image, the 3D image creator 130 outputs the created 3D image to the display controller 140.

FIG. 3C illustrates exemplary display of the 3D image 203 in the case where the polarizing filter 190 is provided on the screen of the display apparatus 180. The polarizing filter 190 is equal in size to the screen of the display apparatus 180. Additionally, the polarizing filter 190 is realized by alternately laying out five right-eye filters 191 (corresponding to the pixel lines R1, R3, R5, R7, and R9 of the right-eye image 201) with five left-eye filters 192 (corresponding to the pixel lines L2, L4, L6, L8, and L10 of the left-eye image 202). Herein, the height (i.e., the length in the vertical direction) of each right-eye filter 191 and left-eye filter 192 is equal to the height of each pixel line in the right-eye image 201 and the left-eye image 202. In addition, in the example shown in FIG. 3C, the right-eye filters 191 and left-eye filters 192 are not misaligned with respect to the respectively corresponding pixel lines of the right-eye image 201 and the left-eye image 202. Via this polarizing filter 190, the pixel lines R1, R3, R5, R7, and R9 constituting part of the 3D image 203 are displayed on the screen of the display apparatus 180 as an image for the right eye, while the pixel lines L2, L4, L6, L8, and L10 constituting part of the 3D image 203 are displayed on the screen of the display apparatus 180 as an image for the left eye. In this way, if a person views a screen with an attached polarizing filter 190 that is displaying the 3D image 203, that person is able to view the 3D image 203 three-dimensionally, as a result of parallax produced by the images for the left and right eyes incident via polarizing glasses.

[Exemplary Computation of Determination Region and exemplary Determination of Pixel Position]

Figure 4A:
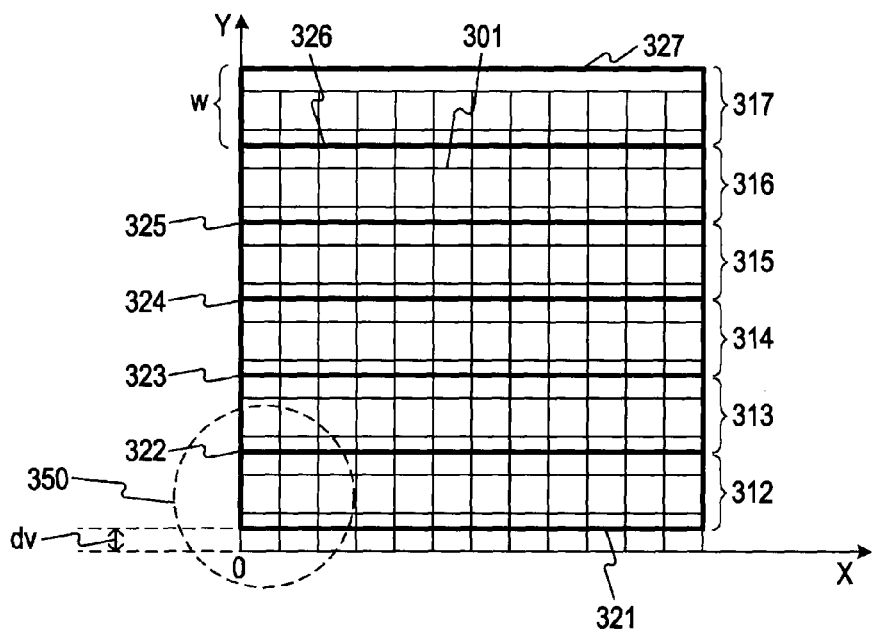
FIG. 4A is a diagram for explaining the computation of determination regions by a determination region computing unit in accordance with a first embodiment of the present invention.
Figure 4B:
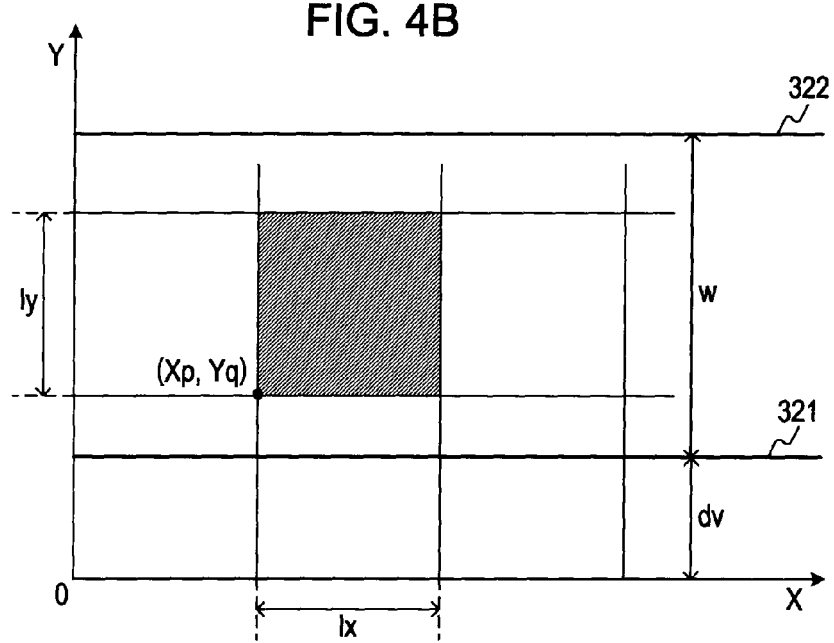
FIG. 4B is a diagram for explaining the determination of pixel position by a pixel layout position determining unit in accordance with a first embodiment of the present invention.

FIG. 4A is a diagram for explaining the computation of determination regions by the determination region computing unit 131 in accordance with the first embodiment of the present invention. FIG. 4B is a diagram for explaining the determination of pixel position by the pixel layout position determining unit 132 in accordance with the first embodiment of the present invention.

At this point, the relationship between the pixel size of a single pixel in the vertical direction of the screen of the display apparatus, and the filter width of a right-eye filter or left-eye filter constituting part of a polarizing filter, will be described. By way of example, the scale of the filter width with respect to the pixel size is taken to be s.

For example, in the case where s=1, a 3D image can be displayed on the display apparatus if there are correct positional relationships between the pixel lines corresponding to the right-eye and left-eye images and the respective lines of the right-eye and left-eye filters. In other words, pixel lines one pixel in height are respectively associated with single lines of a right-eye or left-eye filter. In so doing, it is possible to display a 3D image wherein the right-eye image has been composited at the positions where the right-eye filters are attached, and wherein the left-eye image has been composited at the positions where the left-eye filters are attached.

However, if the polarizing filter is misaligned with respect to the screen of the display apparatus, then the positional relationships between the pixel lines corresponding to the right-eye and left-eye images and the respective lines of the right-eye and left-eye filters might also be misaligned. If these positional relationships are misaligned, then the 3D image displayed via the polarizing filter does not correctly separate, and a clean 3D image is no longer seen (in other words, cross-talk occurs).

Consequently, it is conceivable to present the occurrence of cross-talk by, for example, making the filter width greater than the pixel size. By way of example, consider the case when the filter width is twice the pixel size (i.e., s=2). In this case, the polarizing filter is attached to the screen with each line constituting the polarizing filter being associated with a pixel line one pixel in height in the display apparatus. Furthermore, pixel lines two pixels in height may be associated with two lines of the right-eye and left-eye filters. In so doing, it is possible to display the right-eye image at the positions where the right-eye filters are attached, while displaying the left-eye image at the positions where the left-eye filters are attached. In this case, a 3D image is created by alternately compositing pixel lines two pixels in height from the right-eye image with pixel lines two pixels in height from the left-eye image.

However, if the polarizing filter is misaligned in vertical direction of the screen in the case where s=2, then the respective lines constituting the polarizing filter will not be laid out at positions corresponding to pixel lines two pixels in height in the display apparatus. Even in this case, one pixel-height pixel lines among the two pixel-height pixel lines in the display apparatus will still overlap with single lines of the polarizing filter. For this reason, by laying out one pixel-height pixel lines from the right-eye image or the left-eye image at one pixel-height pixel lines among the two pixel-height pixel lines in the display apparatus, a 3D image is created by alternately compositing one pixel-height pixel lines from the right-eye image with one pixel-height pixel lines from the left-eye image. However, in this case, invalid pixel lines one pixel in height are produced between each one pixel-height pixel line from the right-eye image and each one pixel-height pixel line from the left-eye image. However, a 3D image created in this way does not appear non-uniform, since the pixel lines taken from the right-eye image and the pixel lines taken from the left-eye image are laid out at equal intervals in the vertical direction. Furthermore, cross-talk is prevented without re-attaching the polarizing filter. In other words, by setting s=2, a clean 3D image free of cross-talk can be displayed, even if the polarizing filter has been attached so as to be misaligned with the screen.

In contrast, consider by way of example the case where s>2. In this case, a 3D image is created by alternately compositing s pixel-height pixel lines from the right-eye image with s pixel-height pixel lines from the left-eye image, for example. However, if the polarizing filter is misaligned in vertical direction of the screen in the case where s>2, then the respective lines constituting the polarizing filter will not be laid out at positions corresponding to pixel lines s pixels in height in the display apparatus. Even in this case, (s−1) pixel-height pixel lines among the s pixel-height pixel lines in the display apparatus will still overlap with single lines of the polarizing filter, for example. For this reason, by laying out (s−1) pixel-height pixel lines from the right-eye image or the left-eye image at (s−1) pixel-height pixel lines among the s pixel-height pixel lines in the display apparatus, a 3D image is created by alternately compositing (s−1) pixel-height pixel lines from the right-eye image with (s−1) pixel-height pixel lines from the left-eye image. However, in this case, invalid pixel lines one pixel in height are produced between each (s−1) pixel-height pixel line from the right-eye image and each (s−1) pixel-height pixel line from the left-eye image. In a 3D image created in this way, the pixel size of the (s−1) pixel-height pixel lines from the right-eye and left-eye images increases as the filter width increases, and as a result, the 3D image displayed on-screen is made up of a right-eye image and a left-eye image with large pixel sizes. However, the visual impact of increasing pixel size makes it increasingly more difficult to view a clean and beautiful 3D image.

Meanwhile, if the polarizing filter is misaligned in the vertical direction of the screen in the case where 1<s<2, then in the positional relationships between pixels corresponding to the screen and respective lines of the right-eye and left-eye filters, many pixel lines are produced that belong to neither of the above. For this reason, spatial non-uniformity increases, even when using such a polarizing filter. Additionally, if s<1, not all pixel lines will be contained in the respective lines of the right-eye and left-eye filters.

As described above, since changing the width of the polarizing filter affects the spatial non-uniformity of the output 3D image and the number of valid pixels, configuring the width of the polarizing filter is important. Consequently, the first embodiment of the present invention describes using a polarizing filter with s=2 by way of example. If the visual impact of increasing pixel size is taken into account, a filter width with a scale of s>2 may also be used. In addition, other filter widths able to compensate for vertical misalignment may also be used.

FIG. 4A illustrates a pixel group 301, which is subjected to the computation of determination regions by the determination region computing unit 131. In this pixel group 301, the pixel positions of individual pixels constituting the 3D image displayed on the screen of the display apparatus 180 are respectively expressed by rectangles.

First, the determination region computing unit 131 acquires the parameters received by the parameter input unit 120. By way of example, the first embodiment of the present invention describes the case wherein filter width information w and position correction information dv are input as the parameters. Herein, the filter width information w is a value indicating the vertical length of each filter constituting the polarizing filter provided on the screen of the display apparatus 180. The position correction information dv is a value indicating the amount of vertical misalignment in the polarizing filter provided on the screen of the display apparatus 180. These values are input by the user. Next, the determination region computing unit 131 defines an XY coordinate system, with the X axis taken to be the horizontal direction in the pixel group 301, and the Y axis taken to be the vertical direction. Herein, the lower-left corner of the pixel group 301 is taken to be the origin 0. Next, on the basis of the filter width information w and the position correction information dv input into the parameter input unit 120, the determination region computing unit 131 computes determination regions according to $$y = 2n \times w + dv \qquad \text{Eq. 1}$$

$$y = (2n+1) \times w + dv \qquad \text{Eq. 2}$$

$$y = (2n+2) \times w + dv \qquad \text{Eq. 3}$$

where n is an integer.

In other words, the determination region computing unit 131 computes a right-eye image region in the pixel group 301, in the form of the region between the two lines specified by Eqs. 1 and 2. Additionally, the determination region computing unit 131 also computes a left-eye image region in the pixel group 301, in the form of the region between the two lines specified by Eqs. 2 and 3.

For example, when n=0, Eq. 1 yields y=dv (i.e., the line 321). Also, when n=0, Eq. 2 yields y=w+dv (i.e., the line 322). As a result, the determination region computing unit 131 computes a right-eye image region 312 in the form of the region specified by the line 321 and the line 322. Similarly, when n=0, Eq. 2 yields y=w+dv (i.e., the line 322). Also, Eq. 3 yields y=2w+dv (i.e., the line 323). As a result, the determination region computing unit 131 computes a left-eye image region 313 in the form of the region specified by the line 322 and the line 323.

By modifying the number substituted into n (such as by successively adding 1), the determination region computing unit 131 successively computes right-eye image regions and left-eye image regions as determination regions. More specifically, when n=1, Eqs. 1 to 3 yield the lines 323 to 325, and the determination region computing unit 131 computes the right-eye image region 314 and the left-eye image region 315 as determination regions. In addition, when n=2, Eqs. 1 to 3 yield the lines 325 to 327, and the determination region computing unit 131 computes the right-eye image region 316 and the left-eye image region 317 as determination regions.

As described above, the determination region computing unit 131 computes determination regions, and outputs information regarding the determination regions to the pixel layout position determining unit 132.

FIG. 4B illustrates a method executed by the pixel layout position determining unit 132 for determining the region containing respective pixels constituting the 3D image. FIG. 4B is an enlarged diagram of the pixels contained within the broken circle 35 shown in FIG. 4A.

In the XY coordinate system shown in FIG. 4B, the lower-left edge of a pixel subject to determination by the pixel layout position determining unit 132 takes the coordinates (Xp,Yq). Additionally, the length in the X-axis direction of the pixel subject to determination is taken to be lx, while the length in the Y-axis direction is taken to be ly.

For each pixel constituting the pixel group 301, the pixel layout position determining unit 132 determines the region containing that pixel from among the right-eye image region and the left-eye image region that were computed by the determination region computing unit 131 using Eqs. 1 to 3. More specifically, the pixel layout position determining unit 132 makes determinations using the following Eqs. 4 to 11. The following Eqs. 4 to 7 grouped under the heading (1) are used to determine whether or not the pixel subject to determination is contained in the right-eye image region specified by Eqs. 1 and 2. The following Eqs. 8 to 11 grouped under the heading (2) are used to determine whether or not the pixel subject to determination is contained in the left-eye image region specified by Eqs. 2 and 3.

(1) Conditional Expressions for Determining whether or not Pixel is Contained in Right-eye Image Region $$Yq > 2n \times w + dv \qquad \text{Eq. 4}$$

$$Yq < (2n+1) \times w + dv \qquad \text{Eq. 5}$$

$$Yq + ly > 2n \times w + dv \qquad \text{Eq. 6}$$

$$Yq + ly < (2n+1) \times w + dv \qquad \text{Eq. 7}$$

(2) Conditional Expressions for Determining whether or not Pixel is Contained in Left-eye Image Region $$Yq > (2n+1) \times w + dv \qquad \text{Eq. 8}$$

$$Yq < (2n+2) \times w + dv \qquad \text{Eq. 9}$$

$$Yq + ly > (2n+1) \times w + dv \qquad \text{Eq. 10}$$

$$Yq + ly < (2n+2) \times w + dv \qquad \text{Eq. 11}$$

In other words, if the coordinates (Xp, Yq) satisfy the conditional expressions in Eqs. 4 to 7, then the pixel layout position determining unit 132 determines that the pixel corresponding to the coordinates (Xp, Yq) is contained in the right-eye image region. If the coordinates (Xp,Yq) satisfy the conditional expressions in Eqs. 8 to 11, then the pixel layout position determining unit 132 determines that the pixel corresponding to the coordinates (Xp, Yq) is contained in the left-eye image region.

Herein, if a pixel is determined to be contained in neither the right-eye image region nor the left-eye image region, then that pixel is determined to be contained in an invalid image region. In other words, the pixel layout position determining unit 132 uses Eqs. 4 to 7 in the above heading (1) as well as Eqs. 8 to 11 in the above heading (2) to determine whether or not the pixel corresponding to the coordinates (Xp, Yq) is contained in an invalid image region. More specifically, a pixel is determined to be contained in an invalid image region when at least one of the conditional expressions in Eqs. 4 to 7 in the above heading (1) is not satisfied, and additionally, when at least one of the conditional expressions in Eqs. 8 to 11 in the above heading (2) is not satisfied.

The determination result for the pixel corresponding to the coordinates (Xp, Yq) is output to the determination results storage unit 133 for each pixel. Additionally, the determination results storage unit 133 stores 3D image pixel layout position information, which is associated with the determination result for each pixel. When the 3D image processor 134 creates a 3D image, the determination results storage unit 133 outputs stored 3D image pixel layout position information to the 3D image processor 134. The 3D image processor 134 uses this 3D image pixel layout position information as a basis for extracting the image portions to be composited into the 3D image from the right-eye image and the left-eye image output from the image input unit 110. By compositing these extracted image portions, a 3D image is created.

Figure 5A:
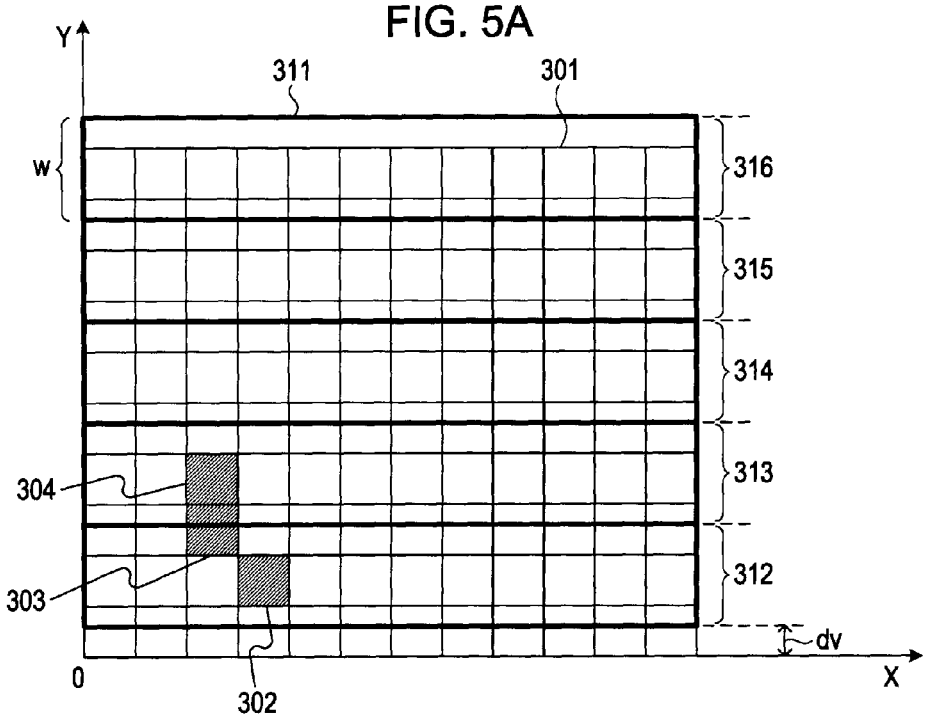
FIG. 5A is a diagram for explaining the determination of pixel position by a pixel layout position determining unit in accordance with a first embodiment of the present invention.
Figure 5B:
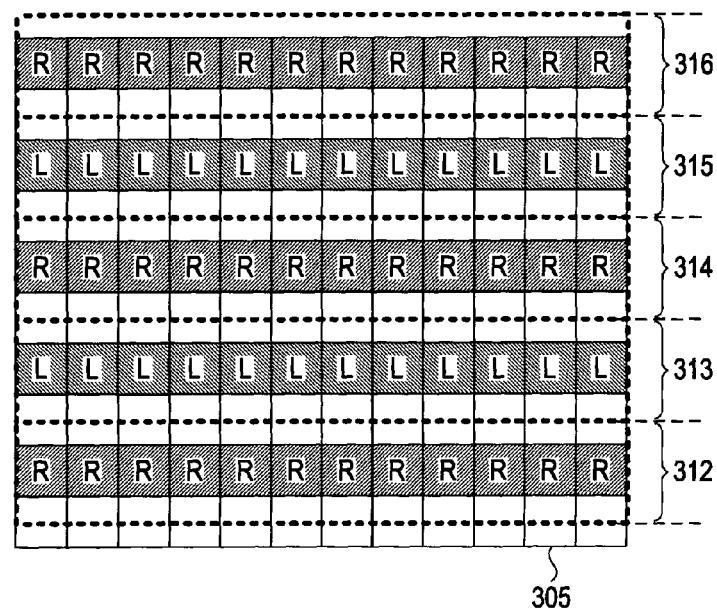
FIG. 5B is a diagram for explaining the creation of a 3D image by a 3D image processor 134 in accordance with a first embodiment of the present invention.

More specifically, the 3D image processor 134 respectively extracts the pixels from the right-eye image that correspond to the pixel positions determined to be contained in the right-eye image region, while also extracting the pixels from the left-eye image that correspond to the pixel positions determined to be contained in the left-eye image region. By subsequently compositing the extracted pixels, a 3D image is created. FIGS. 5A and 5B illustrate the relationship between determination results computed in this way and a 3D image created on the basis of such determination results.

[Exemplary Determination of Pixel Position, and Exemplary 3D Image Created on the Basis of Determination Results]

FIG. 5A is a diagram for explaining the determination of pixel position by the pixel layout position determining unit 132 in accordance with the first embodiment of the present invention. FIG. 5B is a diagram for explaining the creation of a 3D image by the 3D image processor 134 in accordance with the first embodiment of the present invention. As shown in FIG. 5A, right-eye image regions 312, 314, and 316, as well as left-eye image regions 313 and 315 have been computed with respect to the pixel group 301 by the determination region computing unit 131, on the basis of the filter width information w, the position correction information dv, and Eqs. 1 to 3.

Among the pixels constituting the pixel group, the pixel layout position determining unit 132 initiates determination from the pixel in the lower-left corner, and determines each pixel in order while moving to the right in the X-axis direction. When determination of the pixel at the rightmost edge has finished, the pixel layout position determining unit 132 returns to the pixel at the leftmost edge on the adjacent row above the current row in the Y-axis direction, and resumes determination. In the XY coordinate system of the pixel group 301 shown in FIG. 5A herein, the position of an individual pixel is expressed by (Xp,Yq). Herein, p indicates the number of pixels from the origin on the X axis, while q indicates the number of pixels from the origin on the Y axis.

In the example shown in FIG. 5A, 12 pixels are laid out in the X-axis direction, and Xmax is taken to indicate the maximum value of p. Also, in the example shown in FIG. 5A, 10 pixels are laid out in the Y-axis direction, and Ymax is taken to indicate the maximum value of q. Thus, in this example, determination is conducted starting with the pixel corresponding to the coordinates $(X_0, Y_0)$ indicating the origin of the XY coordinate system, and is successively conducted for pixels belonging to the $Y_0$ pixel line while moving to the right in the X-axis direction. When the pixel corresponding to the coordinates $(X_{11}, Y_0)$ has been determined, determination is next conducted for the pixel corresponding to the coordinates $(X_0, Y_1)$, and is successively conducted for pixels belonging to $Y_1$ while moving to the right in the X-axis direction.

The pixel layout position determining unit 132 successively determines whether or not the pixel subject to determination satisfies the conditions in Eqs. 4 to 7 in the above heading (1), or alternatively satisfies the conditions in Eqs. 8 to 11 in the above heading (2). The pixel layout position determining unit 132 thereby determines whether that pixel is contained in the right-eye image region or the left-eye image region. For example, when n=0, the pixel 302 (i.e., the pixel corresponding to the coordinates $(X_3, Y_1)$) satisfies all conditions in Eqs. 4 to 7 in the above heading (1), but does not satisfy the conditions in Eqs. 8 to 11 in the above heading (2). For this reason, the pixel 302 is determined to be contained in the right-eye image region. Meanwhile, the pixel 303 (i.e., the pixel corresponding to the coordinates $(X_2, Y_2)$) satisfies neither the conditions of Eqs. 4 to 7 in heading (1) nor the conditions of Eqs. 8 to 11 in heading (2). For this reason, the pixel 303 is determined to be contained in an invalid image region. More specifically, when n=0, the pixel 303 (i.e., the pixel corresponding to the coordinates $(X_2, Y_2)$) satisfies Eqs. 4 and 6, but since $Y_2+ly>w+dv$, the pixel 303 does not satisfy Eq. 7. For this reason, not all of Eqs. 4 to 7 in heading (1) are satisfied. Furthermore, when n=0, Eqs. 9 to 11 are satisfied, but since $Y_2<w+dv$, Eq. 8 is not satisfied. Therefore, the pixel 303 does not satisfy all of Eqs. 8 to 11 in heading (2). Consequently, the pixel 303 is determined to be contained in an invalid image region. Meanwhile, when n=0, the pixel 304 (i.e., the pixel corresponding to the coordinates $(X_2, Y_3)$) does not satisfy the conditions of Eqs. 4 to 7 in heading (1), but does satisfy the conditions of Eqs. 8 to 11 in heading (2). For this reason, the pixel 304 is determined to be contained in the left-eye image region.

FIG. 5B illustrates an exemplary 3D image created on the basis of 3D image pixel layout position information. As shown by way of example in FIG. 5B, the 3D image processor 134 follows the 3D image pixel layout position information indicating whether each pixel of the pixel group 301 is associated with a right-eye image region or a left-eye image region, and extracts image portions to be composited into the 3D image from the right-eye image and the left-eye image. By compositing the extracted image portions, the 3D image 305 is created. In FIG. 5B, the pixels among those constituting the 3D image 305 that were determined to be contained in the right-eye image regions 312, 314, and 316 are labeled R. The pixels among those constituting the 3D image 305 that were determined to be contained in the left-eye image regions 313 and 315 are labeled L.

[Exemplary Creation of 3D Image]

Figure 6A:
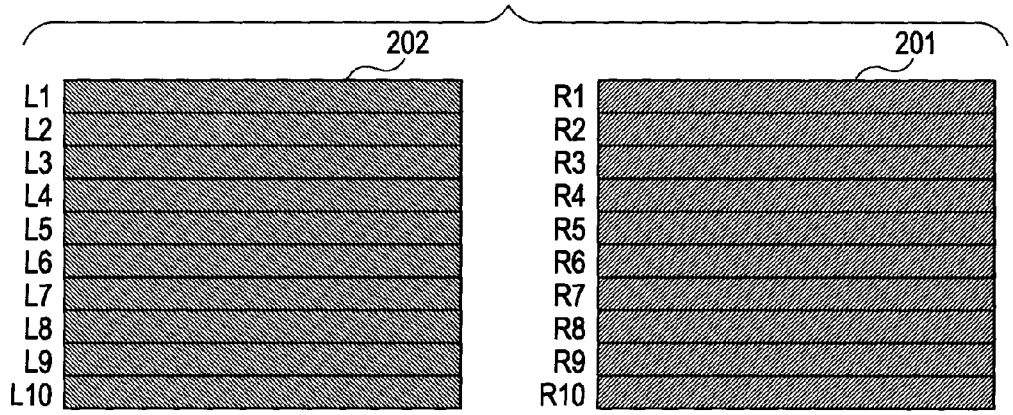
FIG. 6A illustrates an exemplary process flow in the case where a 3D image is created by a 3D image creator in accordance with a first embodiment of the present invention.
Figure 6B:
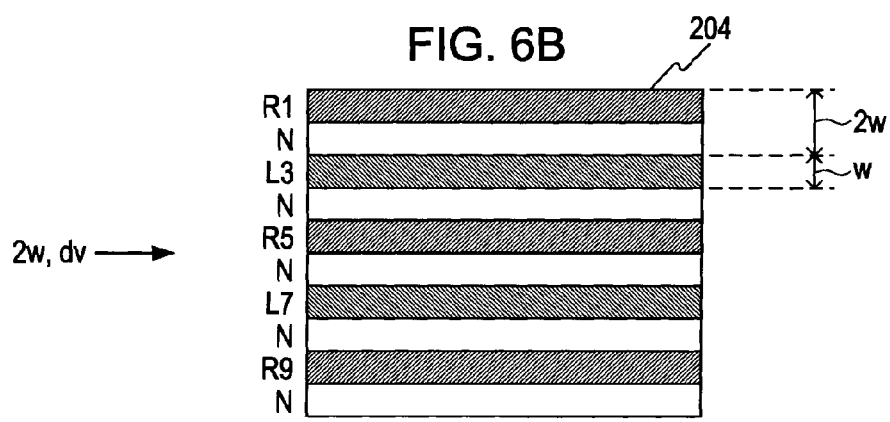
FIG. 6B illustrates an exemplary process flow in the case where a 3D image is created by a 3D image creator in accordance with a first embodiment of the present invention.
Figure 6C:
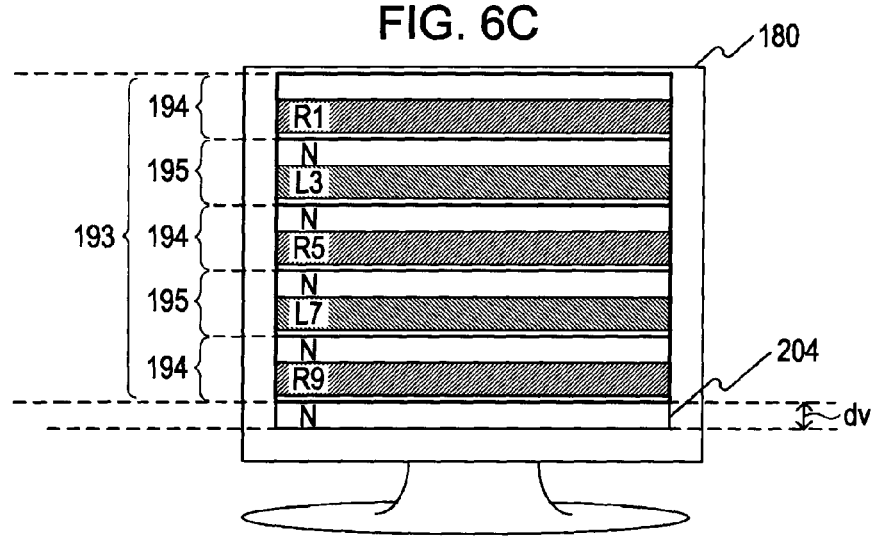
FIG. 6C illustrates an exemplary process flow in the case where a 3D image is created by a 3D image creator in accordance with a first embodiment of the present invention.

FIGS. 6A to 6C illustrate an exemplary process flow in the case where a 3D image is created by the 3D image creator 130 in accordance with the first embodiment of the present invention.

FIG. 6A illustrates the right-eye image 201 and the left-eye image 202 input into the image input unit 110. Since the right-eye image 201 and the left-eye image 202 herein are the same right-eye image 201 and left-eye image 202 shown in FIG. 3A, identical reference numbers are used, and further description thereof is omitted.

FIG. 6B illustrates an exemplary 3D image 204 created by the 3D image creator 130. The 3D image 204 is an exemplary 3D image created on the basis of filter width information 2w and position correction information dv input into the parameter input unit 120. Herein, if w is taken to represent a width one pixel in height in the right-eye image 201 and the left-eye image 202, then the filter width information 2w indicates a width two pixels in height.

The 3D image 204 contains pixel lines N, which are made up of invalid image regions contained in neither the right-eye image region nor the left-eye image region. More specifically, the pixel lines R1, R5, and R9 having widths w and extracted from the right-eye image 201 are alternately arranged with the pixel lines L3 and L7 having widths w and extracted from the left-eye image 202. The respective pixel lines are arranged at an interval w. Additionally, the pixel lines N, being made up of invalid image portions and having widths w, are arranged between the above extracted pixel lines.

FIG. 6C illustrates exemplary display of a 3D image displayed on the screen of the display apparatus 180. A polarizing filter 193 is attached to the screen of the display apparatus 180 shown in FIG. 6C. Herein, the polarizing filter 193 is a polarizing filter having a width that is twice that of a horizontal pixel line one pixel in height. In other words, the right-eye filters 194 and the left-eye filters 195 of the polarizing filter 193 are twice as tall as the right-eye filters and left-eye filters of an ordinary polarizing filter. In addition, due to some reason, the polarizing filter 193 has been attached to the screen of the display apparatus 180 so as to be vertically misaligned by an amount dv. For example, it may be supposed that the user has manually attached the polarizing filter 193.

However, as shown in FIG. 6C, since the display portions made up of the pixel lines R1, R5, and R9 constituting the right-eye image overlap the right-eye filters 194, the right-eye image is output via the right-eye filters 194. Likewise, since the display portions made up of the pixel lines L3 and L7 constituting the left-eye image overlap the left-eye filters 195, the left-eye image is output via the left-eye filters 195. As a result, only the right-eye image enters the right eye of a user wearing polarizing glasses, while only the left-eye image enters the user's left eye. Consequently, since there are no cross-talk effects on the 3D image 204 displayed via the polarizing filter 193 misaligned with respect to the screen, the user is able to suitably view the 3D image 204 three-dimensionally.

[Exemplary Operation of Image Processing Apparatus]

Exemplary operation of an image processing apparatus in accordance with the first embodiment of the present invention will now be described.

Figure 7:
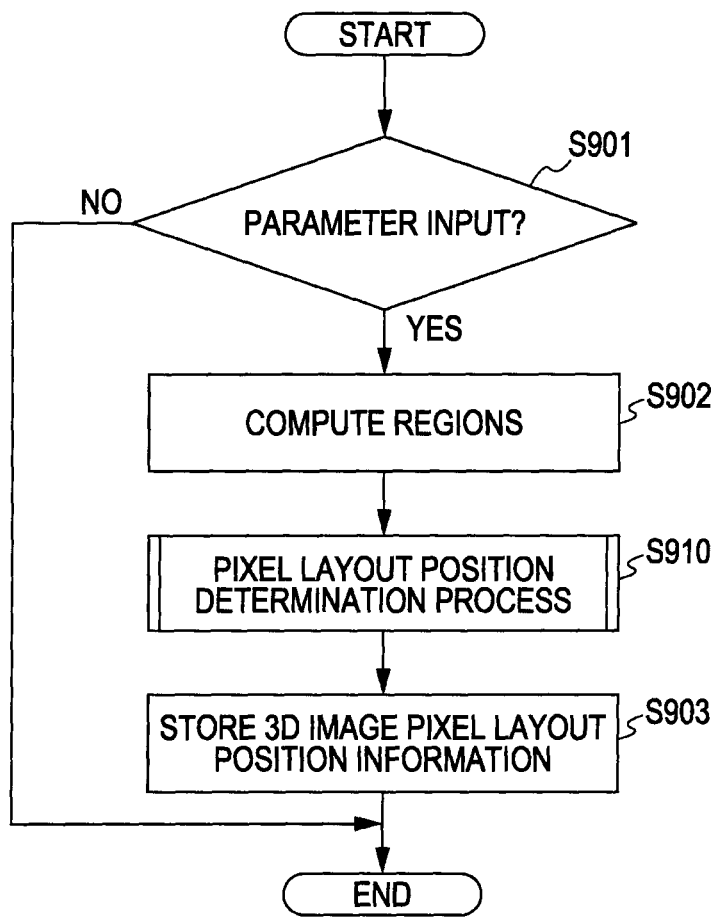
FIG. 7 is a flowchart illustrating a processing sequence for a 3D image pixel layout position determination process executed by a 3D image creator in accordance with a first embodiment of the present invention.

FIG. 7 is a flowchart illustrating a processing sequence for a 3D image pixel layout position determination process executed by the 3D image creator 130 in accordance with the first embodiment of the present invention.

First, it is determined whether or not at least one of either the filter width information or position correction information parameter has been received by the parameter input unit 120 (step S901). If a parameter has not been received (step S901; No), then the 3D image pixel layout position determination process is terminated. If there has been parameter input (step S901; Yes), then the parameter input is used as a basis for computing determination regions by the determination region computing unit 131 (step S902). Step S902 herein is an example of the computation process stated in the claims.

Next, on the basis of the determination regions, a pixel layout position determination process is executed by the pixel layout position determining unit 132 to determine if individual pixels constituting a pixel group are contained in a right-eye image region or a left-eye image region (S910). Step S910 herein is an example of the determination process stated in the claims. This pixel layout position determination process will be later described in detail with reference to FIG. 8. Next, the determination results from the pixel layout position determination process are stored by the determination results storage unit 133 as 3D image pixel layout position information (step S903). Subsequently, the 3D image pixel layout position determination process is terminated.

Figure 8:
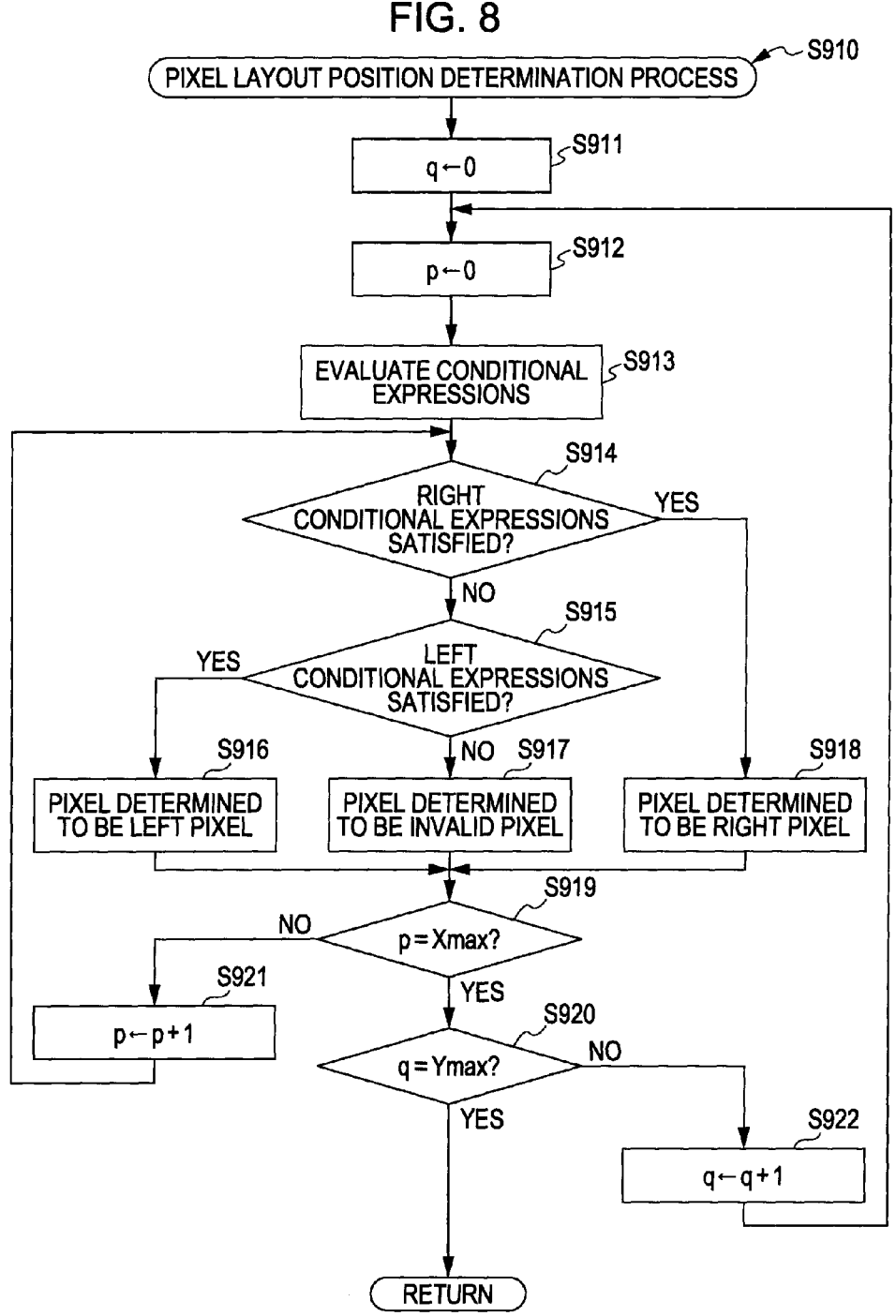
FIG. 8 is a flowchart illustrating a pixel layout position determination process constituting part of a processing sequence for a 3D image pixel layout position determination process executed by a 3D image creator in accordance with a first embodiment of the present invention (i.e., the processing in step S910 shown in FIG. 7)

FIG. 8 is a flowchart illustrating a pixel layout position determination process constituting part of the processing sequence for the 3D image pixel layout position determination process executed by the 3D image creator 130 in accordance with the first embodiment of the present invention (i.e., the processing in step S910 shown in FIG. 7).

First, with respect to the coordinates (Xp, Yq), q is initialized to 0 (step 5911) and p is initialized to 0 (step S912). Next, conditional expressions (i.e., the right-eye conditional expressions in Eqs. 4 to 7, and the left-eye conditional expressions in Eqs. 8 to 11) are calculated for the pixel subject to determination and corresponding to the coordinates (Xp, Yq) (step S913). On the basis of the calculation results, it is determined whether or not the pixel subject to determination satisfies all of the right-eye conditional expressions in Eqs. 4 to 7 (step S914). If the pixel subject to determination satisfies all of the right-eye conditional expressions in Eqs. 4 to 7 (step S914; Yes), then the pixel subject to determination is determined to be contained in a right-eye image region (step S918). In contrast, if the pixel subject to determination does not satisfy the right-eye conditional expressions (step S914; No), then it is subsequently determined whether or not the pixel subject to determination satisfies all of the left-eye conditional expressions in Eqs. 8 to 11 (step S915). If the pixel subject to determination satisfies all of the left-eye conditional expressions (step S915; Yes), then the pixel subject to determination is determined to be contained in a left-eye image region (step S916). If the pixel subject to determination does not satisfy all of the left-eye conditional expressions (step S915; No), then the pixel subject to determination is determined to be contained in an invalid image region (step S917). If p=Xmax, thus indicating that the pixel subject to determination is at the rightmost edge of the pixel group (step S919; Yes), then it is determined whether or not the pixel subject to determination is at the topmost edge of the pixel group (step S920). In contrast, if the pixel subject to determination is not at the rightmost edge of the pixel group (step S919; No), then p is incremented by 1 (step S921), and conditional expressions are calculated for the next pixel subject to determination (step S913). In step S920, if q=Ymax, thus indicating that the pixel subject to determination is at the upper-right corner of the pixel group (step S920; Yes), then the pixel determination process is terminated. If q≠Ymax, thus indicating that the pixel subject to determination is not at the upper-right corner of the pixel group (step S920; No), then q is incremented by 1 (step S922), p is reset to 0 (step S912), and conditional expressions are calculated for the next pixel subject to determination (step S913).

Figure 9:
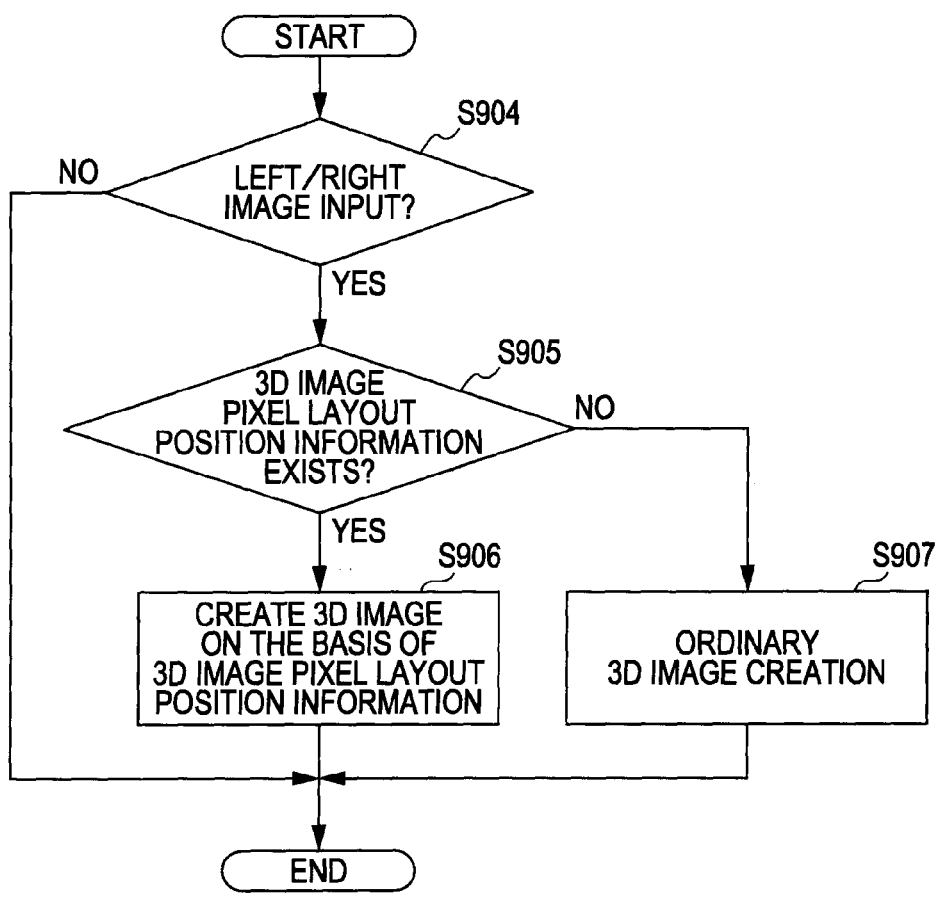
FIG. 9 is a flowchart illustrating a processing sequence for a 3D image creation process executed by a 3D image creator in accordance with a first embodiment of the present invention.

FIG. 9 is a flowchart illustrating a processing sequence for a 3D image creation process executed by the 3D image creator 130 in accordance with the first embodiment of the present invention. The following describes an example wherein a 3D image is displayed using an image set made up of a right-eye image and a left-eye image input into the image input unit 110.

If an image set made up of a right-eye image and a left-eye image is input into the image input unit 110 (step S904; Yes), then it is determined whether or not 3D image pixel layout position information is being stored in the determination results storage unit 133 (step S905). If 3D image pixel layout position information is being stored in the determination results storage unit 133 (step S905; Yes), then the 3D image processor 134 uses that 3D image pixel layout position information as a basis for extracting image portions from the right-eye image and the left-eye image. Subsequently, the 3D image processor 134 composites the extracted image portions to create 3D image (step S906). Step S906 herein is an example of the 3D image processing sequence stated in the claims. In contrast, if 3D image pixel layout position information is not being stored in the determination results storage unit 133 (step S905; No), then the 3D image processor 134 extracts image portions from the right-eye image and the left-eye image corresponding to pixel positions set in advance. Subsequently, the 3D image processor 134 composites the extracted image portions to create a 3D image (step S907). For example, an ordinary 3D image may be created, wherein the right-eye image and the left-eye image are respectively inserted into every other scan line of the 3D image in an alternating pattern. Upon creation of a 3D image (step S906 or S907), the 3D image creation process executed by the 3D image processor 134 is terminated.

As described above, according to the first embodiment of the present invention, the 3D image creator 130 acquires from the parameter input unit 120 position correction information indicating the positional misalignment of the polarizing filter. On the basis of this parameter, the 3D image creator 130 is able to correct the positional misalignment and create a 3D image. In so doing, a 3D image free of cross-talk can be displayed, even in the case where positional misalignment with respect to the screen has occurred as a result of manually attaching a polarizing filter compliant with the μPol or similar technique to an existing display apparatus, for example. Meanwhile, it is also assumed that decreases in yield will occur due to positional misalignments in the manufacturing process for attaching a polarizing filter to the screen of a display apparatus. However, according to the first embodiment of the present invention, a 3D image corrected for positional misalignments can be created, without correcting the positional misalignment itself or re-attaching the polarizing filter. For this reason, manufacturing costs related to polarizing filter attachment can be decreased. Furthermore, if a high-resolution display or similar display apparatus made up of highly dense pixels is used, then the effects of decreased resolution due to the addition of invalid image regions can also be alleviated. In addition, it is also assumed that the cost of increasing pixel density in a display apparatus will decrease more than the manufacturing cost of attaching a polarizing filter to a display apparatus, for example. By applying the first embodiment of the present invention to a high-resolution display, for example, the effects of decreased resolution due to the addition of invalid image regions can be alleviated. For this reason, the manufacturing step of attaching a polarizing filter to a display apparatus can be omitted. In so doing, display apparatus manufacturing costs can be decreased.

2. Second Embodiment

The first embodiment of the present invention described the example of correcting vertical misalignment of the polarizing filter. The second embodiment of the present invention describes the example of correcting rotational misalignment of the polarizing filter in addition to vertical misalignment. It should be appreciated that an image processing apparatus in accordance with the second embodiment of the present invention is identical in configuration to the image processing apparatus 100 shown in FIG. 1. For this reason, identical reference numbers will be hereinafter used for portions that are identical to those of the first embodiment of the present invention, and further description thereof will be omitted. By way of example, rotational misalignment of the polarizing filter is herein quantified by position correction information dr indicating the rotational misalignment of the polarizing filter, and received as a parameter by the parameter input unit 120.

[Exemplary Computation of Determination Region and Exemplary Determination of Pixel Position]

Figure 10A:
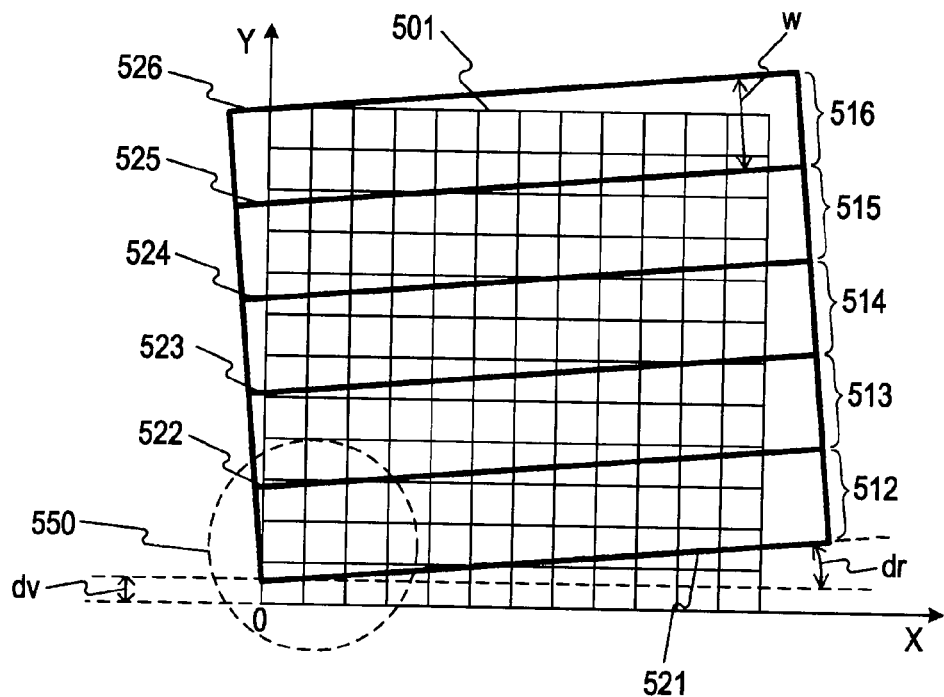
FIG. 10A is a diagram for explaining the computation of determination regions by a determination region computing unit in accordance with a second embodiment of the present invention.
Figure 10B:
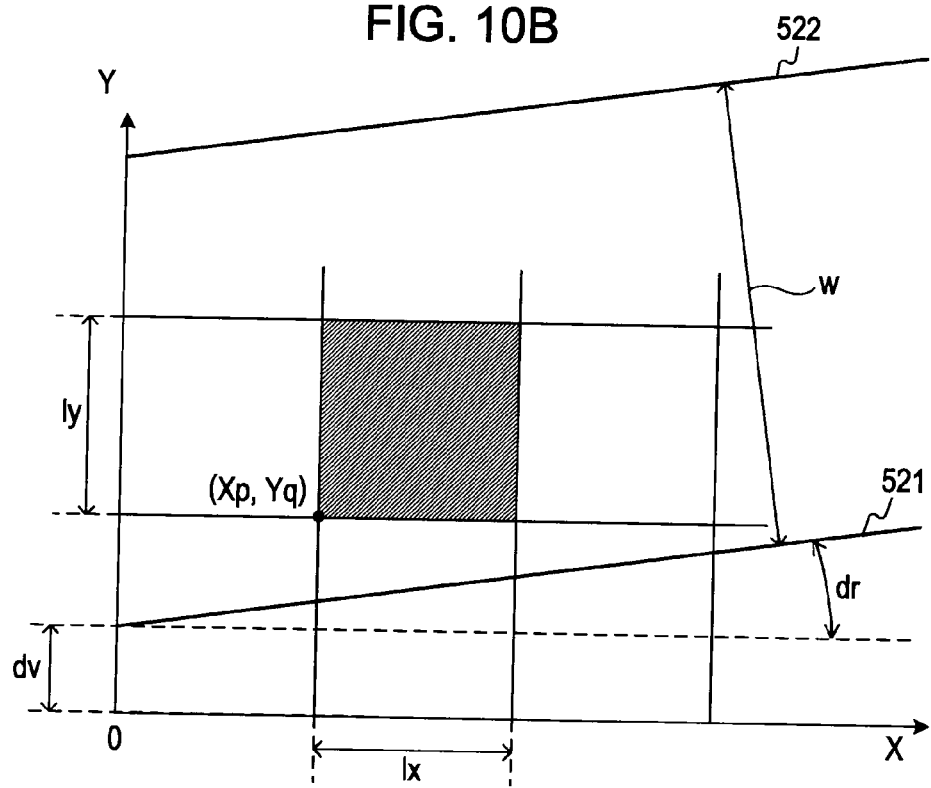
FIG. 10B is a diagram for explaining the determination of pixel position by a pixel layout position determining unit in accordance with a second embodiment of the present invention.

FIG. 10A is a diagram for explaining the computation of determination regions by the determination region computing unit 131 in accordance with the second embodiment of the present invention. FIG. 10B is a diagram for explaining the determination of pixel position by the pixel layout position determining unit 132 in accordance with the second embodiment of the present invention.

At this point, the relationship between the pixel size of a single pixel in the vertical direction of the screen of the display apparatus, and the vertical filter width of a right-eye filter or left-eye filter constituting part of a polarizing filter, will be described. By way of example, the scale of the filter width with respect to the pixel size is taken to be s.

When pixel lines in the vertical and horizontal directions are taken into account, the maximum angle of rotational misalignment can be considered to be 45°. For this reason, when rotational misalignment in addition to vertical misalignment of the polarizing filter is taken into account, it is possible to accommodate arbitrary angles by assuming a rotational angle of 45°, for example. Note that when just vertical misalignment is taken into account, the relationship becomes like that shown in the first embodiment of the present invention. Thus, by using twice the square root of 2 ($2\sqrt{2}$) as the value of the filter width s shown in the first embodiment of the present invention, the relationship between pixel size and filter width can be considered to be similar to the relationships shown in the first embodiment of the present invention. These relationships can be expressed by the following cases (a) to (d).

(a) When $s=2\sqrt{2}$, spatial non-uniformity of the portion that appears three-dimensional is maximally reduced.

(b) When $s>2\sqrt{2}$, spatial non-uniformity increases, and the number of valid pixels increases.

(c) When $\sqrt{2} \leqq s < 2\sqrt{2}$, spatial non-uniformity increases, and the number of valid pixels decreases.

(d) When $s<\sqrt{2}$, all pixels become invalid pixels. Given the above relationships, the second embodiment of the present invention describes using polarizing filter with $s=2\sqrt{2}$ by way of example. If the visual impact of increasing the vertical width is taken into account, then a filter width with a scale of $s>2\sqrt{2}$ may also be used. Other filter widths enabling correction of both vertical and rotational misalignments may also be used.

FIG. 10A illustrates a pixel group 501, which is subjected to the computation of determination regions by the determination region computing unit 131. In this pixel group 501, the pixel positions of individual pixels constituting the 3D image displayed on the screen of the display apparatus 180 are respectively expressed by rectangles (i.e., a grid of 12×12 rectangles).

First, the determination region computing unit 131 acquires the parameters received by the parameter input unit 120. By way of example, the second embodiment of the present invention describes the case wherein filter width information w and position correction information dv and dr are input as the parameters. Herein, the filter width information w is a value indicating the vertical length of each filter constituting the polarizing filter provided on the screen of the display apparatus 180. The position correction information dv is a value indicating the amount of vertical misalignment in the polarizing filter provided on the screen of the display apparatus 180. The position correction information dv is a value indicating the amount of rotational misalignment in the polarizing filter provided on the screen of the display apparatus 180.

The above values are input by the user into the parameter input unit 120. Next, the determination region computing unit 131 defines an XY coordinate system similarly as in the first embodiment of the present invention, with the X axis taken to be the horizontal direction in the pixel group 501, and the Y axis taken to be the vertical direction. Herein, the lower-left corner of the pixel group 501 is taken to be the origin 0. Next, on the basis of the filter width information w and the position correction information dv and dr input into the parameter input unit 120, the determination region computing unit 131 computes determination regions according to $$y = \tan(dr) \times x + 2n \times w \times \cos(dr) + dv \qquad \text{Eq. 12}$$

$$y = \tan(dr) \times x + (2n+1) \times w \times \cos(dr) + dv \qquad \text{Eq. 13}$$

$$y = \tan(dr) \times x + (2n+2) \times w \times \cos(dr) + dv \qquad \text{Eq. 14}$$

where n is an integer.

In other words, the determination region computing unit 131 computes a right-eye image region in the pixel group 501, in the form of the region between the two lines specified by Eqs. 12 and 13. Additionally, the determination region computing unit 131 also computes a left-eye image region in the pixel group 501, in the form of the region between the two lines specified by Eqs. 13 and 14.

For example, when n=0, Eq. 12 yields $y=\tan(dr) \times x + dv$ (i.e., the line 521). Also, when n=0, Eq. 13 yields $y=\tan(dr) \times x + w \times \cos(dr) + dv$ (i.e., the line 522). As a result, the determination region computing unit 131 computes a right-eye image region 512 in the form of the region specified by the line 521 and the line 522. Similarly, when n=0, Eq. 13 yields $y=\tan(dr) \times x + w \times \cos(dr) + dv$ (i.e., the line 522). Also, Eq. 14 yields $y=\tan(dr) \times x + 2 \times w \times \cos(dr) + dv$ (i.e., the line 523). As a result, the determination region computing unit 131 computes a left-eye image region 513 in the form of the region specified by the line 522 and the line 523.

By modifying the natural number substituted into n (such as by successively adding 1), the determination region computing unit 131 successively computes right-eye image regions and left-eye image regions as determination regions. More specifically, when n=1, Eqs. 12 to 14 yield the lines 523 to 525, and the determination region computing unit 131 computes the right-eye image region 514 and the left-eye image region 515 as determination regions. In addition, when n=2, Eqs. 12 to 14 yield the lines 525 and 526, and the determination region computing unit 131 computes the right-eye image region 516 as a determination region.

As described above, the determination region computing unit 131 computes determination regions, and outputs information regarding the determination regions to the pixel layout position determining unit 132.

FIG. 10B illustrates a method executed by the pixel layout position determining unit 132 for determining the region containing respective pixels constituting the 3D image. FIG. 10B is an enlarged diagram of the pixels contained within the broken circle 550 shown in FIG. 10A.

In the XY coordinate system shown in FIG. 10B, the lower-left edge of a pixel subject to determination by the pixel layout position determining unit 132 takes the coordinates (Xp, Yq). Additionally, the length in the X-axis direction of the pixel subject to determination is taken to be lx, while the length in the Y-axis direction is taken to be ly.

For each pixel constituting the pixel group 501, the pixel layout position determining unit 132 determines the region containing that pixel from among the right-eye image region and the left-eye image region that were computed by the determination region computing unit 131 using Eqs. 12 to 14. More specifically, the pixel layout position determining unit 132 makes determinations using the following Eqs. 15 to 22. The following Eqs. 15 to 18 grouped under the heading (3) are used to determine whether or not the pixel subject to determination is contained in the right-eye image region specified by Eqs. 12 and 13. The following Eqs. 19 to 22 grouped under the heading (4) are used to determine whether or not the pixel subject to determination is contained in the left-eye image region specified by Eqs. 13 and 14.

(3) Conditional Expressions for Determining whether or not Pixel is Contained in Right-eye Image Region $$Yq > \tan(dr) \times x + 2n \times w \times \cos(dr) + dv \quad \text{Eq. 15}$$

$$Yq < \tan(dr) \times x + (2n+1) \times w \times \cos(dr) + dv \quad \text{Eq. 16}$$

$$Yq + ly > \tan(dr) \times x + 2n \times w \times \cos(dr) + dv \quad \text{Eq. 17}$$

$$Yq + ly < \tan(dr) \times x + (2n+1) \times w \times \cos(dr) + dv \quad \text{Eq. 18}$$

(4) Conditional Expressions for Determining whether or not Pixel is Contained in Left-eye Image Region $$Yq > \tan(dr) \times x + (2n+1) \times w \times \cos(dr) + dv \quad \text{Eq. 19}$$

$$Yq < \tan(dr) \times x + (2n+2) \times w \times \cos(dr) + dv \quad \text{Eq. 20}$$

$$Yq + ly > \tan(dr) \times x + (2n+1) \times w \times \cos(dr) + dv \quad \text{Eq. 21}$$

$$Yq + ly < \tan(dr) \times x + (2n+2) \times w \times \cos(dr) + dv \quad \text{Eq. 22}$$

In other words, if the coordinates (Xp, Yq) satisfy the conditional expressions in Eqs. 15 to 18, then the pixel layout position determining unit 132 determines that the pixel corresponding to the coordinates (Xp, Yq) is contained in the right-eye image region. If the coordinates (Xp, Yq) satisfy the conditional expressions in Eqs. 19 to 22, then the pixel layout position determining unit 132 determines that the pixel corresponding to the coordinates (Xp, Yq) is contained in the left-eye image region.

Herein, if a pixel is determined to be contained in neither the right-eye image region nor the left-eye image region, then that pixel is determined to be contained in an invalid image region. In other words, the pixel layout position determining unit 132 uses Eqs. 15 to 18 in the above heading (3) as well as Eqs. 19 to 22 in the above heading (4) to determine whether or not the pixel corresponding to the coordinates (Xp, Yq) is contained in an invalid image region. More specifically, a pixel is determined to be contained in an invalid image region when at least one of the conditional expressions in Eqs. 15 to 18 in the above heading (3) is not satisfied, and additionally, when at least one of the conditional expressions in Eqs. 19 to 22 in the above heading (4) is not satisfied.

The determination result for the pixel corresponding to the coordinates (Xp, Yq) is output to the determination results storage unit 133 for each pixel. Additionally, the determination results storage unit 133 stores 3D image pixel layout position information, which is associated with the determination result for each pixel. When the 3D image processor 134 creates a 3D image, the determination results storage unit 133 outputs stored 3D image pixel layout position information to the 3D image processor 134. The 3D image processor 134 uses this 3D image pixel layout position information as a basis for extracting the image portions to be composited into the 3D image from the right-eye image and the left-eye image output from the image input unit 110. By compositing these extracted image portions, a 3D image is created.

Figure 11A:
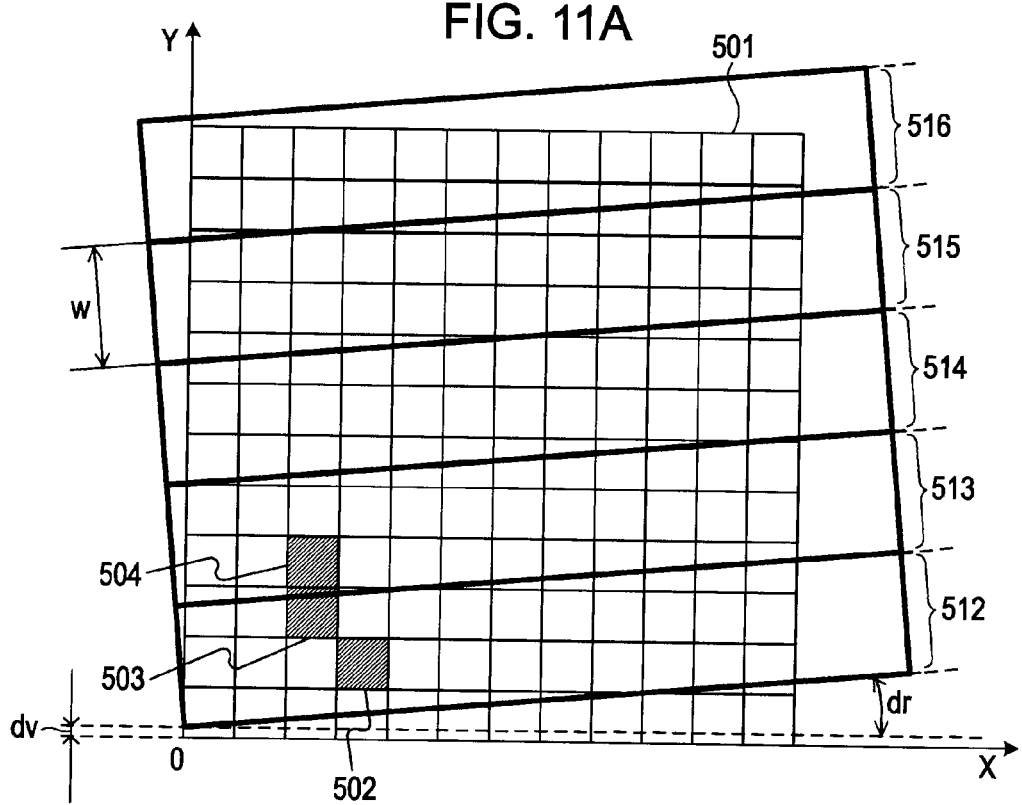
FIG. 11A is a diagram for explaining the determination of pixel position by a pixel layout position determining unit in accordance with a second embodiment of the present invention.
Figure 11B:
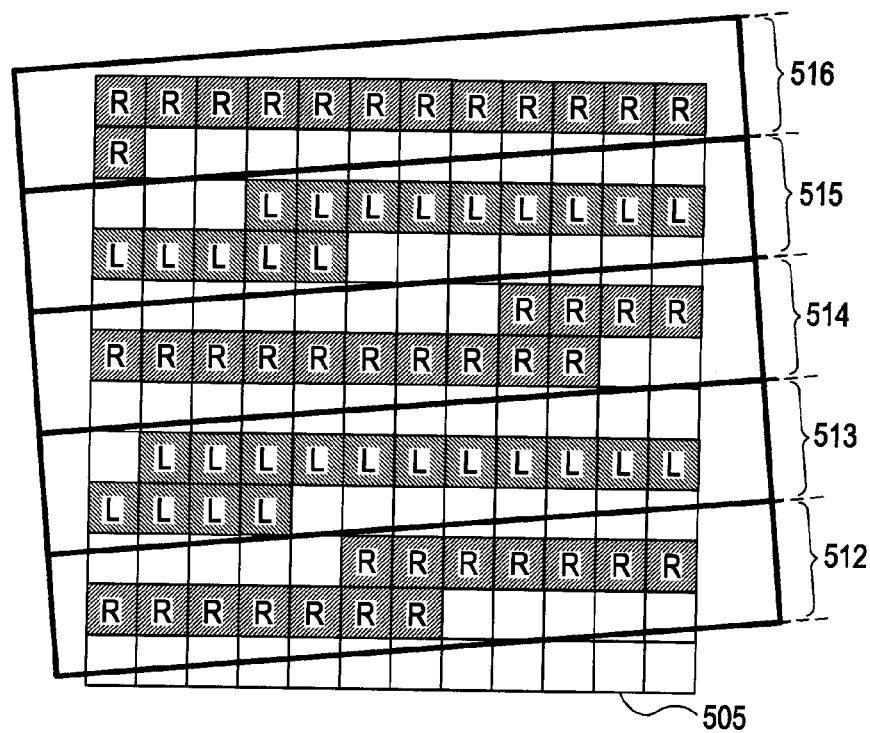
FIG. 11B is a diagram for explaining the creation of a 3D image by a 3D image processor in accordance with a second embodiment of the present invention.

More specifically, the 3D image processor 134 respectively extracts the pixels from the right-eye image that correspond to the pixel positions determined to be contained in the right-eye image region, while also extracting the pixels from the left-eye image that correspond to the pixel positions determined to be contained in the left-eye image region. By subsequently compositing the extracted pixels, a 3D image is created. FIGS. 11A and 11B illustrate the relationship between determination results computed in this way and a 3D image created on the basis of such determination results.

[Exemplary Determination of Pixel Position, and Exemplary 3D Image Created on the Basis of Determination Results]

FIG. 11A is a diagram for explaining the determination of pixel position by the pixel layout position determining unit 132 in accordance with the second embodiment of the present invention. FIG. 11B is a diagram for explaining the creation of a 3D image by the 3D image processor 134 in accordance with the second embodiment of the present invention. As shown in FIG. 11A, right-eye image regions 512, 514, and 516, as well as left-eye image regions 513 and 515 have been computed with respect to the pixel group 501 by the determination region computing unit 131, on the basis of the filter width information w, the position correction information dv and dr, and Eqs. 12 to 14.

Among the pixels constituting the pixel group, the pixel layout position determining unit 132 initiates determination from the pixel in the lower-left corner, and determines each pixel in order while moving to the right in the X-axis direction. When determination of the pixel at the rightmost edge has finished, the pixel layout position determining unit 132 returns to the pixel at the leftmost edge on the adjacent row above the current row in the Y-axis direction, and resumes determination. In the XY coordinate system of the pixel group 501 shown in FIG. 11A herein, the position of an individual pixel is expressed by (Xp, Yq). Herein, p indicates the number of pixels from the origin on the X axis, while q indicates the number of pixels from the origin on the Y axis. In the example shown in FIG. 11A, 12 pixels are laid out in the X-axis direction, and Xmax is taken to indicate the maximum value of p. Also, in the example shown in FIG. 11A, 12 pixels are laid out in the Y-axis direction, and Ymax is taken to indicate the maximum value of q. Thus, in this example, determination is conducted starting with the pixel corresponding to the coordinates $(X_0, Y_0)$ indicating the origin of the XY coordinate system, and is successively conducted for pixels belonging to the $Y_0$ pixel line while moving to the right in the X-axis direction. When the pixel corresponding to the coordinates $(X_{11}, Y_0)$ has been determined, determination is next conducted for the pixel corresponding to the coordinates $(X_0, Y_1)$, and is successively conducted for pixels belonging to $Y_1$ while moving to the right in the X-axis direction.

The pixel layout position determining unit 132 successively determines whether or not the pixel subject to determination satisfies the conditions in Eqs. 15 to 18 in the above heading (3), or alternatively satisfies the conditions in Eqs. 19 to 22 in the above heading (4). The pixel layout position determining unit 132 thereby determines whether that pixel is contained in the right-eye image region or the left-eye image region. For example, when n=0, the pixel 502 (i.e., the pixel corresponding to the coordinates $(X_3, Y_1)$) satisfies all conditions in Eqs. 15 to 18 in the above heading (3), but does not satisfy the conditions in Eqs. 19 to 22 in the above heading (4). For this reason, the pixel 502 is determined to be contained in the right-eye image region. Meanwhile, the pixel 503 (i.e., the pixel corresponding to the coordinates $(X_2, Y_2)$) satisfies neither the conditions of Eqs. 15 to 18 in heading (3) nor the conditions of Eqs. 19 to 22 in heading (4). For this reason, the pixel 503 is determined to be contained in an invalid image region. More specifically, when n=0, the pixel 503 (i.e., the pixel corresponding to the coordinates $(X_2, Y_2)$) satisfies Eqs. 15 and 17, but since $Y_2 + ly > \tan(dr) \times X_2 + 2w \times \cos(dr) + dv$, the pixel 503 does not satisfy Eq. 18. For this reason, not all of Eqs. 18 to 18 in heading (3) are satisfied. Furthermore, when n=0, Eqs. 20 to 22 are satisfied, but since $Y_2 < \tan(dr) \times X_2 + w \times \cos(dr) + dv$, Eq. 19 is not satisfied. Therefore, the pixel 503 does not satisfy all of Eqs. 19 to 22 in heading (4). Consequently, the pixel 503 is determined to be contained in an invalid image region. Meanwhile, when n=0, the pixel 504 (i.e., the pixel corresponding to the coordinates $(X_2, Y_3)$) does not satisfy the conditions of Eqs. 15 to 18 in heading (3), but does satisfy the conditions of Eqs. 19 to 22 in heading (4). For this reason, the pixel 504 is determined to be contained in the left-eye image region.

FIG. 11B illustrates an exemplary 3D image created on the basis of 3D image pixel layout position information. As shown by way of example in FIG. 11B, the 3D image processor 134 follows the 3D image pixel layout position information indicating whether each pixel of the pixel group 301 is associated with a right-eye image region or a left-eye image region, and extracts image portions to be composited into the 3D image from the right-eye image and the left-eye image. By compositing the extracted image portions, the 3D image 505 is created. In FIG. 11B, the pixels among those constituting the 3D image 505 that were determined to be contained in the right-eye image regions 512, 514, and 516 are labeled R. The pixels among those constituting the 3D image 505 that were determined to be contained in the left-eye image regions 513 and 515 are labeled L.

[Exemplary Creation of 3D Image]

Figure 12A:
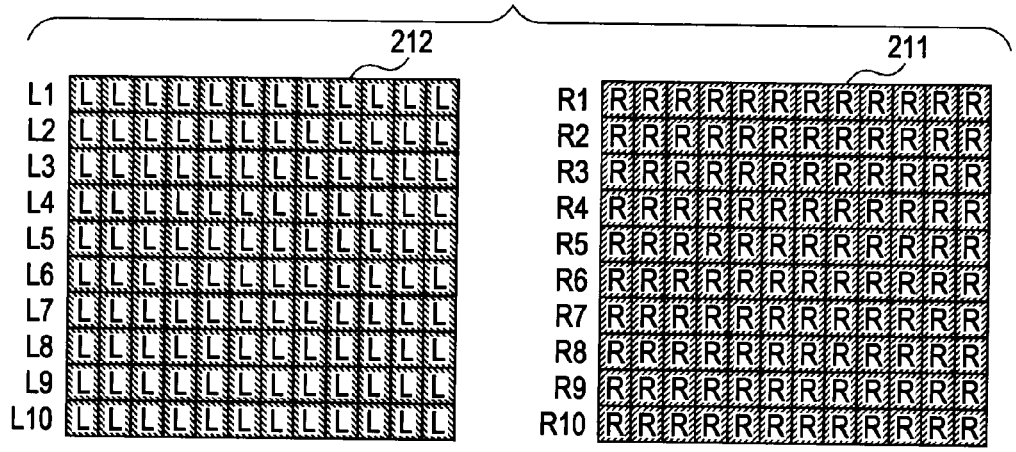
FIG. 12A illustrates an exemplary process flow in the case where a 3D image is created by a 3D image creator in accordance with a second embodiment of the present invention.
Figure 12B:
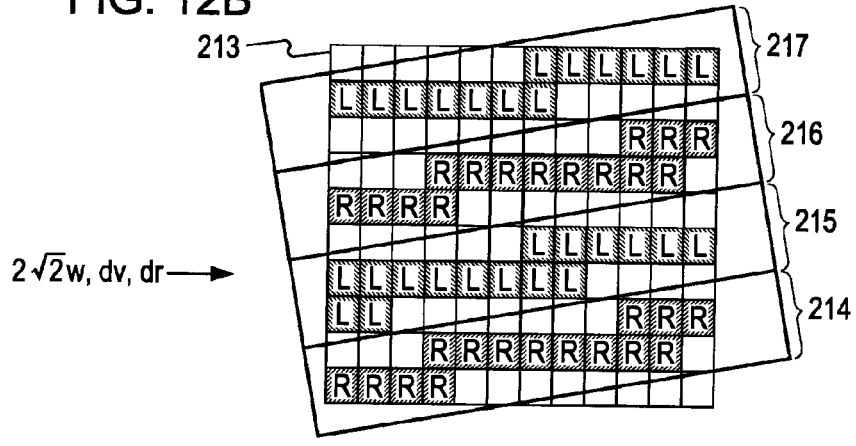
FIG. 12B illustrates an exemplary process flow in the case where a 3D image is created by a 3D image creator in accordance with a second embodiment of the present invention.
Figure 12C:
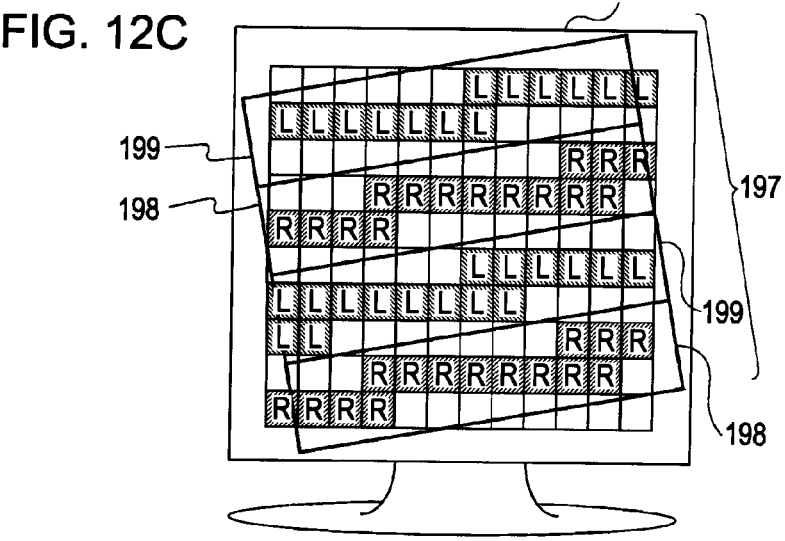
FIG. 12C illustrates an exemplary process flow in the case where a 3D image is created by a 3D image creator in accordance with a second embodiment of the present invention.

FIGS. 12A to 12C illustrate an exemplary process flow in the case where a 3D image is created by the 3D image creator 130 in accordance with the second embodiment of the present invention.

FIG. 12A illustrates a right-eye image 211 and a left-eye image 212 input into the image input unit 110. As shown in FIG. 12A, the pixels constituting the right-eye image 211 are labeled R, while the pixels constituting the left-eye image 212 are labeled L.

FIG. 12B illustrates an exemplary 3D image 213 created by the 3D image creator 130. The 3D image 213 is an exemplary 3D image created on the basis of filter width information $2\sqrt{2}w$ and position correction information dv and dr input into the parameter input unit 120. Herein, if w is taken to represent a width one pixel in height in the right-eye image 211 and the left-eye image 212, then the filter width information $2\sqrt{2}w$ indicates a width $2\sqrt{2}$ pixels in height. In addition, as shown in FIG. 12B, the 3D image 213 has been created on the basis of right-eye image regions 214, 216, and 218, as well as left-eye image regions 215 and 217. These right-eye and left-eye image regions are the determination regions that were computed by the determination region computing unit 131. Among the pixels constituting the 3D image 213 in FIG. 12B, pixels contained in a right-eye image region are labeled R, while pixels contained in a left-eye image region are labeled L. Meanwhile, pixels contained in neither a right-eye image region nor a left-eye image region are blank.

FIG. 12C illustrates exemplary display of a 3D image displayed on the screen of the display apparatus 180. A polarizing filter 197 is attached to the screen of the display apparatus 180 shown in FIG. 12C. Herein, the polarizing filter 197 has been attached to the screen of the display apparatus 180 so as to be vertically misaligned by an amount dv, and additionally, rotationally misaligned by a rotational amount dr. The polarizing filter herein is taken to be made up of right-eye filters 198 and left-eye filters 199, each having a width of $2\sqrt{2}w$.

In this way, even if the polarizing filter 197 has been attached to the screen so as to be misaligned by a rotational amount, the right-eye image and the left-eye image are still suitably displayed on the screen of the display apparatus 180, as shown in FIG. 12C. In other words, the right-eye image labeled R overlaps the right-eye filters 198, while the left-eye image labeled L overlaps the left-eye filters 199. Consequently, since there are no cross-talk effects on the 3D image 213 displayed via the polarizing filter 197 misaligned with respect to the screen, the user is able to suitably view the 3D image 213 three-dimensionally.

It should be appreciated that changing the width of the polarizing filter affects the spatial non-uniformity (i.e., unevenness) of the output 3D image and the number of valid pixels. For example, in the second embodiment of the present invention, the following effects (e) to (h) are expected, where s is taken to be the scale factor of the vertical width of each right-eye or left-eye filter constituting the polarizing filter (i.e., the filter width) with respect to the vertical width of a single pixel in the display apparatus.

(e) When $s=2\sqrt{2}$, spatial non-uniformity of the portion that appears three-dimensional is maximally reduced.

(f) When $s>2\sqrt{2}$, spatial non-uniformity increases, and the number of valid pixels increases.

(g) When $\sqrt{2} \leq s < 2\sqrt{2}$, spatial non-uniformity increases, and the number of valid pixels decreases.

(h) When $s<\sqrt{2}$, all pixels become invalid pixels. Consequently, when applying the second embodiment of the present invention, it is preferable to use a polarizing filter with $s=2\sqrt{2}$.

As described above, according to the second embodiment of the present invention, the 3D image creator 130 acquires, from the parameter input unit 120, a rotational amount indicating rotational misalignment, and in the form of position correction information indicating the positional misalignment of the polarizing filter. On the basis of this parameter, the 3D image creator 130 is able to correct the positional misalignment and create a 3D image. In so doing, a 3D image free of cross-talk can be displayed, even in the case where positional misalignment due to rotation with respect to the screen has occurred as a result of manually attaching a polarizing filter compliant with the μPol or similar technique to an existing display apparatus, for example.

The foregoing embodiments of the present invention describe an image processing apparatus provided with a display 150. However, an embodiment of the present invention may also be applied to, for example, an image processing apparatus that enables a 3D image to be created by a 3D image creator, output to an external display apparatus, and then displayed by that external display apparatus.

The embodiments of the present invention herein are examples for realizing the present invention, and correspond to that stated in the claims. However, an embodiment of the present invention is not limited to the above, and various modifications may be made without departing from the scope and spirit of the present invention.

Furthermore, the processing sequences described in the foregoing embodiments of the present invention may be taken to be a method including a series of such steps, or alternatively, a program causing a computer to execute a series of such steps, or a recording medium storing such a program. Various media may be used as the recording medium, including CDs (Compact Discs), MDs (MiniDiscs), DVDs (Digital Versatile Discs), memory cards, and Blu-ray Discs™, for example.

The present application contains subject matter related to that disclosed in Japanese Priority Patent Application JP 2008-315524 filed in the Japan Patent Office on Dec. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a non-transient computer readable recording medium configured for storage of program instructions; and
at least one processor;
wherein the program instructions cause the at least one processor to create a 3D image according to information about a polarizing filter affixed in a stable position relative to a 3D image display by performing the functions of:
an input unit configured to receive filter width information indicating the vertical size of each line constituting the affixed polarizing filter, as well as position correction information indicating positional misalignment of the affixed polarizing filter;
a computing unit configured to compute determination regions for each pixel on the basis of the filter width information and the position correction information, with the determination regions being used to determine whether individual pixels constituting the 3D image to be output are contained in a right-eye image region or a left-eye image region;
a determining unit configured to determine, on a per-pixel basis, whether a respective pixel is contained in a right-eye image region or a left-eye image region, the determination being made on the basis of the determination regions computed for each pixel;
and a 3D image processor configured to create a 3D image from a right-eye image and a left-eye image according to pixel positions determined on the basis of determination results from the determining unit.

2. The image processing apparatus according to claim 1, wherein the position correction information includes information regarding vertical misalignment of the polarizing filter, and the computing unit computes the determination regions in the form of horizontal lines having fixed vertical widths specified by the filter width information and the misalignment information.

3. The image processing apparatus according to claim 2, wherein the polarizing filter is affixed to the front of a display screen upon which the created 3D image is displayed, with the vertical size of each line constituting the polarizing filter being twice a reference value expressing the vertical size of the pixels, and the computing unit computes the determination regions having fixed widths equal to the vertical size of the pixels.

4. The image processing apparatus according to claim 2, wherein the position correction information includes information regarding rotational misalignment of the polarizing filter, and the computing unit computes the determination regions by rotating the horizontal lines by an angle specified by the rotational misalignment information.

5. The image processing apparatus according to claim 4, wherein the polarizing filter is affixed to the front of a display screen upon which the created 3D image is displayed, with the vertical size of each line constituting the polarizing filter being $2\sqrt{2}$ times a reference value expressing the vertical size of the pixels.

6. The image processing apparatus according to claim 1, wherein pixels determined to be contained in neither a right-eye image region nor a left-eye image region are determined by the determining unit to be contained in an invalid image region where the 3D image is not output.

7. An image processing apparatus, comprising:
a non-transient computer readable recording medium configured for storage of program instructions; and
at least one processor;
wherein the program instructions cause the at least one processor to create a 3D image according to information about a polarizing filter affixed in a stable position relative to a 3D image display by performing the functions of:
an input unit configured to receive filter width information indicating the vertical size of each line constituting the affixed polarizing filter, as well as position correction information indicating positional misalignment of the affixed polarizing filter;
a computing unit configured to compute determination regions for each pixel on the basis of the filter width information and the position correction information, with the determination regions being used to determine whether individual pixels constituting the 3D image to be output are contained in a right-eye image region or a left-eye image region;
a determining unit configured to determine, on a per-pixel basis, whether a respective pixel is contained in a right-eye image region or a left-eye image region, the determination being made on the basis of the determination regions computed for each pixel;
and a determination results storage unit configured to store 3D image pixel layout position information indicating the pixel positions of each pixel constituting a right-eye image and a left-eye image used to create the 3D image, with the pixel positions being determined on the basis of the determination results from the determining unit.

8. An image processing method to be performed on at least one processor, comprising the steps of:
creating, with the at least one processor, a 3D image according to information about a polarizing filter affixed in a stable position relative to a 3D image display by:
computing determination regions, with the at least one processor, for each pixel on the basis of filter width information indicating the vertical size of each line constituting an affixed polarizing filter, as well as position correction information indicating positional misalignment of the affixed polarizing filter, with the determination regions being used to determine whether individual pixels constituting the 3D image to be output are contained in a right-eye image region or a left-eye image region;

determining, with the at least one processor, on a per-pixel basis, whether a respective pixel is contained in a right-eye image region or a left-eye image region, the determination being made on the basis of the determination regions computed for each pixel;

and creating, with the at least one processor, the 3D image from a right-eye image and a left-eye image according to pixel positions determined on the basis of determination results from the determining step.

9. A program, stored on a non-transient computer readable recording medium, causing a computer to create a 3D image according to information about a polarizing filter affixed in a stable position relative to a 3D image display by executing the steps of:

computing determination regions for each pixel on the basis of filter width information indicating the vertical size of each line constituting the affixed polarizing filter, as well as position correction information indicating positional misalignment of the affixed polarizing filter, with the determination regions being used to determine whether individual pixels constituting the 3D image to be output are contained in a right-eye image region or a left-eye image region;

determining, on a per-pixel basis, whether a respective pixel is contained in a right-eye image region or a left-eye image region, the determination being made on the basis of the determination regions computed for each pixel;

and creating a 3D image from a right-eye image and a left-eye image according to pixel positions determined on the basis of determination results from the determining step.

* * * * *